US012434149B2

(12) United States Patent
Liang et al.

(10) Patent No.: US 12,434,149 B2
(45) Date of Patent: Oct. 7, 2025

(54) GAME DATA PROCESSING METHOD AND APPARATUS, COMPUTER, AND READABLE STORAGE MEDIUM

(71) Applicant: TENCENT TECHNOLOGY (SHENZHEN) COMPANY LIMITED, Shenzhen (CN)

(72) Inventors: Yuxuan Liang, Shenzhen (CN); Yuxin Xiao, Shenzhen (CN); Kangrui Wu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 579 days.

(21) Appl. No.: 17/874,220

(22) Filed: Jul. 26, 2022

(65) Prior Publication Data

US 2022/0355204 A1 Nov. 10, 2022

Related U.S. Application Data

(63) Continuation of application No. PCT/CN2021/106177, filed on Jul. 14, 2021.

(30) Foreign Application Priority Data

Jul. 29, 2020 (CN) ........................ 202010744247.X

(51) Int. Cl.
*A63F 13/00* (2014.01)
*A63F 13/35* (2014.01)
(Continued)

(52) U.S. Cl.
CPC ............. *A63F 13/60* (2014.09); *A63F 13/35* (2014.09); *A63F 13/46* (2014.09)

(58) Field of Classification Search
CPC .......... A63F 13/12; A63F 13/35; A63F 13/46; A63F 13/60
See application file for complete search history.

(56) References Cited

U.S. PATENT DOCUMENTS 6,758,756 B1 * 7/2004 Horigami ................ A63F 13/54 463/31
8,529,346 B1 * 9/2013 Johnston ................ A63F 13/95 463/31

(Continued)

FOREIGN PATENT DOCUMENTS

CN 102402436 A 4/2012
CN 103713890 A 4/2014

(Continued)

OTHER PUBLICATIONS

The World Intellectual Property Organization (WIPO) International Search Report for PCT/CN2021/106177 Oct. 13, 2021 6 pages (including translation).

*Primary Examiner* — Dmitry Suhol
*Assistant Examiner* — Jason Pinheiro
(74) *Attorney, Agent, or Firm* — ANOVA LAW GROUP PLLC

(57) ABSTRACT

Embodiments of this application disclose a game data processing method and apparatus, a computer, and a readable storage medium. The method includes displaying a game loading screen in a web presentation page in response to a game data loading request for a web simulation game; obtaining user game data in a client game associated with the web simulation game based on the game data loading request, and calling a game engine of the web simulation game to obtain, through the game engine of the web simulation game, game scene data of the web simulation game that is generated based on the user game data; and displaying a game scene screen rendered based on the game scene data (Continued)

of the web simulation game, the game scene screen responsive to a game interactive operation associated with the web simulation game.

19 Claims, 10 Drawing Sheets

(51) Int. Cl.
*A63F 13/46* (2014.01)
*A63F 13/60* (2014.01)

(56) References Cited

U.S. PATENT DOCUMENTS

| | | | | |
|---|---|---|---|---|
| 9,333,429 | B2 * | 5/2016 | LaMontange | A63F 13/30 |
| 9,734,503 | B1 * | 8/2017 | Gargi | G06Q 30/0631 |
| 11,123,635 | B2 * | 9/2021 | Brown | A63F 13/69 |
| 11,405,347 | B1 * | 8/2022 | Roim Ferreira | H04L 65/1093 |
| 11,429,363 | B2 * | 8/2022 | Bamba | A63F 13/77 |
| 11,436,646 | B2 * | 9/2022 | von Hein | G06F 16/972 |
| 2003/0109313 | A1 * | 6/2003 | Gavin | A63F 13/45 463/43 |
| 2007/0255617 | A1 * | 11/2007 | Maurone | G06Q 30/0277 705/14.73 |
| 2008/0227553 | A1 * | 9/2008 | Leifenberg | A63F 13/85 463/42 |
| 2009/0258712 | A1 * | 10/2009 | Tanaka | A63F 13/49 463/43 |
| 2010/0293365 | A1 * | 11/2010 | Tandon | A63F 13/77 717/121 |
| 2010/0332328 | A1 * | 12/2010 | Dharmaji | G06Q 30/0267 705/14.64 |
| 2011/0258049 | A1 * | 10/2011 | Ramer | G06Q 30/0273 705/14.69 |
| 2012/0079057 | A1 * | 3/2012 | Fainberg | G06F 12/0862 709/214 |
| 2012/0158513 | A1 * | 6/2012 | Schoen | G06Q 30/0276 705/14.66 |
| 2013/0073401 | A1 * | 3/2013 | Cook | G06Q 30/0277 705/14.73 |
| 2015/0019186 | A1 * | 1/2015 | Kwon | G06F 30/20 703/7 |
| 2015/0066684 | A1 * | 3/2015 | K. V | G06F 16/951 705/26.7 |
| 2015/0134781 | A1 * | 5/2015 | Silberstein | G06F 16/9574 709/219 |
| 2015/0258445 | A1 * | 9/2015 | Park | A63F 13/537 463/31 |
| 2015/0258449 | A1 * | 9/2015 | Jeong | A63F 13/828 463/29 |
| 2015/0258455 | A1 * | 9/2015 | Lee | A63F 13/828 463/31 |
| 2017/0011433 | A1 * | 1/2017 | von Hein | H04L 67/02 |

FOREIGN PATENT DOCUMENTS

| | | | |
|---|---|---|---|
| CN | 105404539 | A | 3/2016 |
| CN | 111767503 | A | 10/2020 |
| WO | 2017054735 | A1 | 4/2017 |

* cited by examiner

GAME DATA PROCESSING METHOD AND APPARATUS, COMPUTER, AND READABLE STORAGE MEDIUM

RELATED APPLICATIONS

This application is a continuation application of PCT Application No. PCT/CN2021/106177, filed on Jul. 14, 2021, which in turn claims priority to Chinese Patent Application No. 202010744247.X, entitled "GAME DATA PROCESSING METHOD AND APPARATUS, COMPUTER, AND READABLE STORAGE MEDIUM" filed on Jul. 29, 2020. The two applications are incorporated by reference in their entirety.

FIELD OF THE TECHNOLOGY

This application relates to the field of computer technologies, and in particular, to a game data processing method and apparatus, a computer, and a computer readable storage medium.

BACKGROUND OF THE DISCLOSURE

With the development of the Internet and the enrichment of people's entertainment life, more online games have appeared. Staff of online games usually publicize the online games to enable users to understand the gameplay, plot, or scene design of the online games, thereby attracting the users through the promotion. Currently, an online game is usually promoted through a game video, and the game video is generated by the staff in advance by extracting relevant data from the online game. However, because the game video is pre-generated, a user can obtain only information about the online game promoted by the staff but cannot select data that the user intends to obtain. Alternatively, the promotion of the online game may be implemented based on page switching. For example, a link of the online game is introduced in a promotional web page, and a staff member then switches back and forth between the promotional web page and the online game, so that the user can view a specific scene in the online game.

SUMMARY

Embodiments of this application provide a game data processing method and apparatus, a computer, and a readable storage medium, which can enhance interactivity between a game promotion part and a user, and improve richness of game promotion content and fluency of game promotion presentation screens.

One aspect of the embodiments of this application provides a game data processing method. The method includes displaying a game loading screen in a web presentation page in response to a game data loading request for a web simulation game; obtaining user game data in a client game associated with the web simulation game based on the game data loading request, and calling a game engine of the web simulation game to obtain, through the game engine of the web simulation game, game scene data of the web simulation game that is generated based on the user game data; and displaying a game scene screen rendered based on the game scene data of the web simulation game, the game scene screen responsive to a game interactive operation associated with the web simulation game.

Another aspect of the embodiments of this application provides a game data processing method. The method includes receiving, from user equipment, information about a user that has logged in to a web simulation game; obtaining, according to the information about the login user, user game data of a client game associated with the web simulation game and that corresponds to the information about the user; converting the user game data of the client game into game simulation parameters by using a user game data processing unit in the web simulation game, and adding the game simulation parameter into initial simulation data to generate game scene data of the web simulation game, the initial simulation data being data in the web simulation game that has not been combined with the user game data of the client game; and transmitting the game scene data to the user equipment.

Another aspect of the embodiments of this application provides a non-transitory computer-readable storage medium, storing a computer program, the computer program including a program instruction, and the program instruction, when executed by a processor, performing the game data processing method according to one of the aspects of the embodiments of this application.

BRIEF DESCRIPTION OF THE DRAWINGS

To describe the technical solutions in the embodiments of this application or the related art more clearly, the following briefly describes the accompanying drawings required for describing the embodiments or the related art. Apparently, the accompanying drawings in the following description show merely some embodiments of this application, and a person of ordinary skill in the art may still derive other drawings from the accompanying drawings without creative efforts.

DESCRIPTION OF EMBODIMENTS

The technical solutions in the embodiments of this application are clearly and completely described in the following with reference to the accompanying drawings in the embodiments of this application. Apparently, the described embodiments are merely some rather than all of the embodiments of this application.

Some game videos used for promoting online games can jump between promotional web pages and the online games, so that users can view specific scenes in the online games. However, these technologies require user equipment to store games and web page promotion content, which may consume more memory space. In addition, when a promotional web page is switched to a game, a relatively large amount of data needs to be loaded and processed, resulting in poor display of game promotion content. Correspondingly, the embodiments of this application provide a game data processing method and apparatus, a computer, and a readable storage medium to improve these technologies.

According to the embodiments of this application, when promotion is performed for a plurality of users, a large amount of data may be generated. In this case, a data transmission technology in the field of big data may be used to improve efficiency of game data exchange. The data transmission technology may be used for data exchange between a web front end and a game engine front end and between a front end and a backend in this application.

Big data refers to a collection of data that cannot be captured, managed, and processed by conventional software tools within a certain time range. Big data refer to a massive high-volume, highly-growing velocity, and diversified high-variety information assets that requires new processing modes to have that enable stronger enhanced decision-making, insight discovery, and process optimization capabilities. With the advent of the cloud era, big data also attracts more and more attention, and big data requires special technologies to efficiently process a large amount of data that tolerates elapsed time. Technologies applicable to the big data, including a massively parallel processing database, data mining, a distributed file system, a distributed database, a cloud computing platform, the internet, and a scalable storage system.

Figure 1:
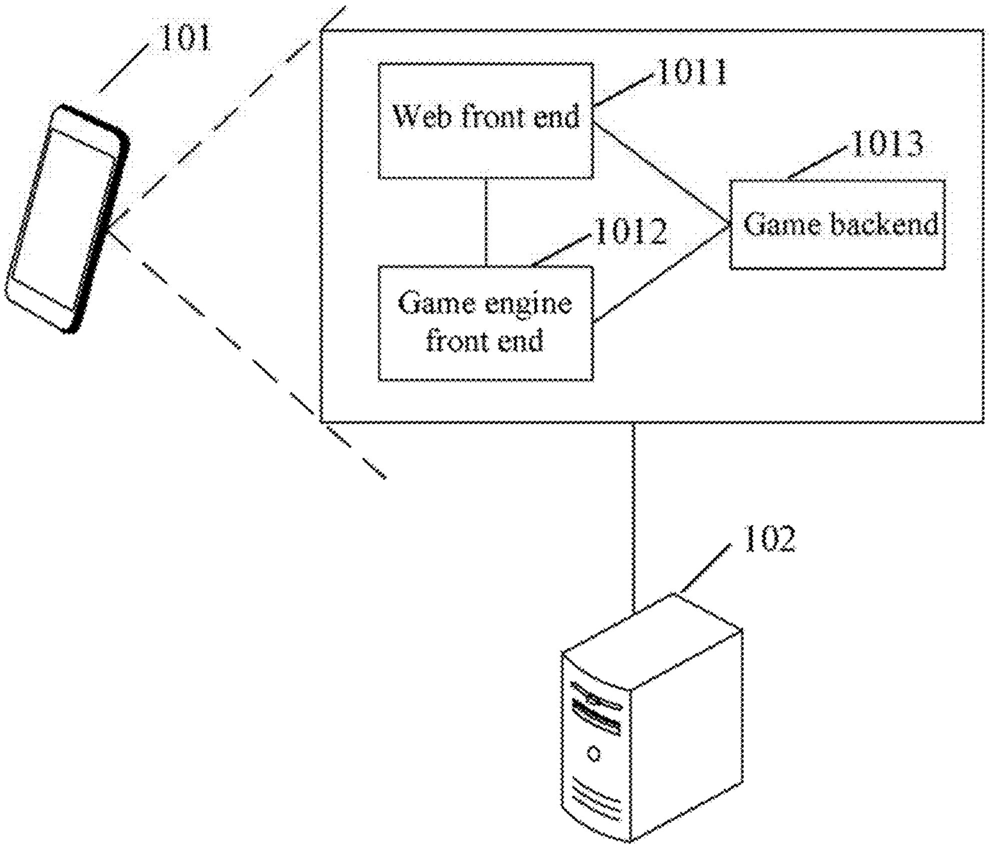
FIG. 1 is a diagram of a network architecture of game data processing according to an embodiment of this application.

In some embodiments, referring to FIG. 1, FIG. 1 is a diagram of a network architecture of game data processing according to an embodiment of this application. This embodiment may be implemented by a computer device. The computer device may include a server and a terminal device. The computer device may alternatively be a server or a terminal device. This is not limited herein. This embodiment may be applied to any game, for example, a first-person shooter game (FPS) or a role-playing game (RPG), such as GAME FOR PEACE, CROSSFIRE: KING OF GUN BATTLE (Cross Fire Mobile Games, CFM), or COUNTER-STRIKE.

As shown in FIG. 1, user equipment 101 enters a game promotion scene, and the implemented game promotion scene includes a web front end 1011, a game engine front end 1012, a game backend 1013, and the like. The user equipment 101 displays part of promotion content of a client game through the web front end 1011, displays a game loading screen based on the web front end 1011 in response to a game data loading request for a web simulation game in the web front end 1011, obtains, from the game backend 1013, game scene data requested by the game data loading request, and displays, based on the game engine front end 1012, a game scene screen obtained through rendering by using the game scene data. The client game may be a published game corresponding to the web simulation game. The client game is a game that needs to be promoted. Through combination of the web page and the game engine, a web simulation game corresponding to the client game is generated in interactive marketing for the client game, and simple functions of the client game are implemented through the web simulation game, thereby improving interactivity with users and richness of game promotion content. To obtain game scene data, the user equipment 101 obtains user game data from a first server 102 corresponding to the client game and generates game scene data based on the user game data, to combine real game data of users in interactive marketing of the game to improve authenticity of game promotion.

It can be understood that the computer device or the user equipment mentioned in this embodiment includes, but is not limited to, a terminal device or a server. In other words, the computer device or the user equipment may be a server or a terminal device, or may be a system including a server and a terminal device. The terminal device mentioned above may be an electronic device, including, but not limited to, a mobile phone, a tablet computer, a desktop computer, a notebook computer, a palmtop computer, an augmented reality/virtual reality (AR/VR) device, a helmet display, a wearable device, a smart speaker, other mobile Internet devices (MIDs) with a network access capability, and the like.

For example, it is assumed that the client game is "GAME FOR PEACE." A staff member generates game promotion content based on the game "GAME FOR PEACE," the game promotion content including game description promotion content and game simulation promotion content. The game description promotion content may be a game commentary video or game image description generated according to the client game, or a game text commentary, or the like. This is not limited herein. The game simulation promotion content is generated through a web simulation game corresponding to the client game. In one embodiment, the game promotion content may include only game simulation promotion content. A user may play the game directly in the web simulation game to know relevant information about the client game. The web simulation game may be generated according to main scenes and functions in the client game. In other words, the web simulation game is equivalent to a simplified version of the client game, and a user can interact with an interactive marketing scene of the client game through the web simulation game.

Interactive marketing is a marketing model in which a wide range of consumers participate in a promotion. In the marketing process, companies obtain opinions and suggestions of the consumers for use in product planning and design to optimize the client game.

Figure 2:
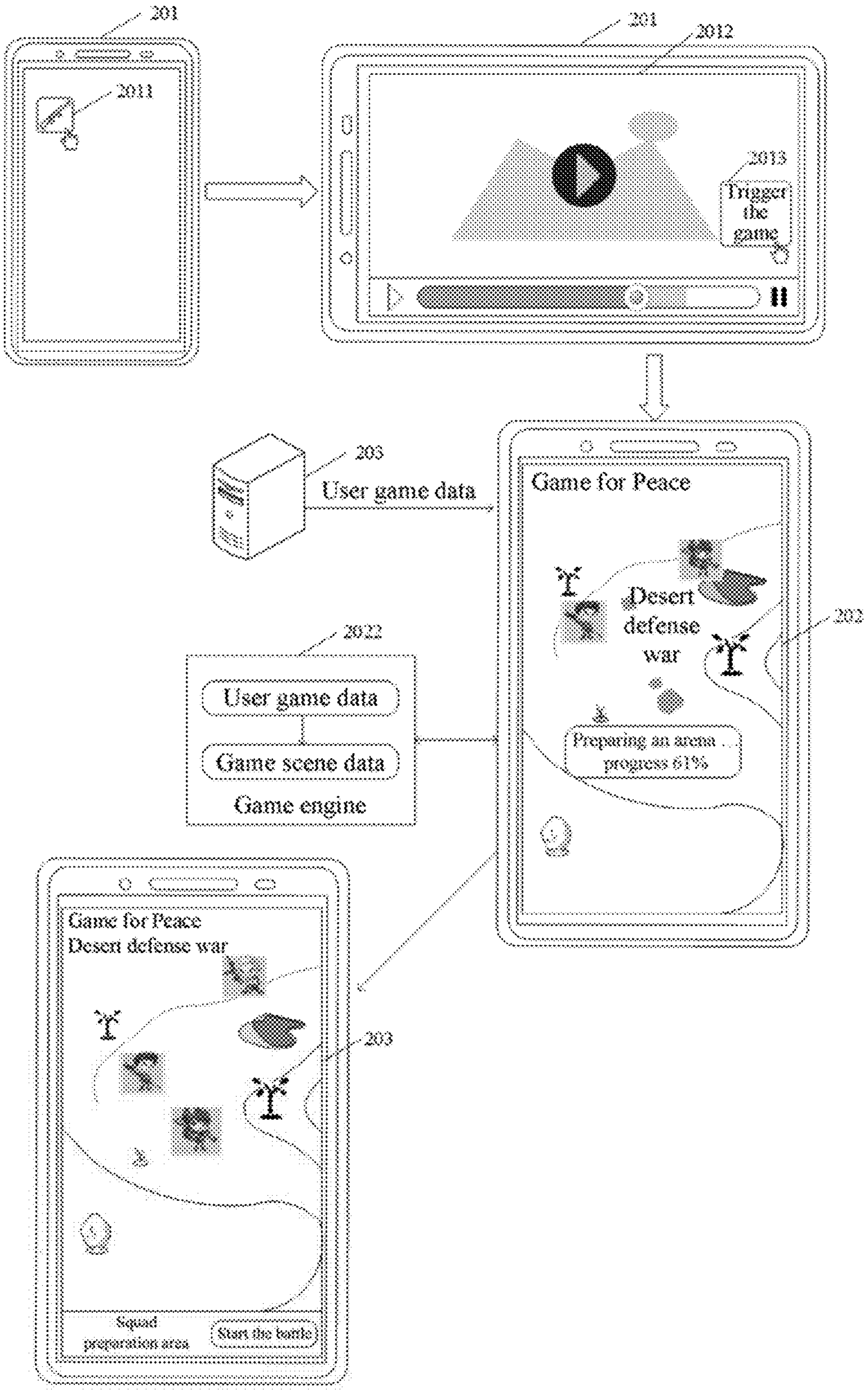
FIG. 2 is a schematic diagram of a game data processing scenario according to an embodiment of this application.

For example, referring to FIG. 2, FIG. 2 is a schematic diagram of a game data processing scenario according to an embodiment of this application. As shown in FIG. 2, in an example, the game promotion content includes game description promotion content and game simulation promotion content. A user A clicks on a game promotion content thumbnail 2011 in user equipment 201 to perform a trigger operation. The user equipment 201 displays game description promotion content 2012 in response to the trigger operation for the game promotion content thumbnail 2011. A game trigger label 2013 is displayed on a page where the game description promotion content 2012 is located. When the game trigger label 2013 is triggered, a game data loading request for a web simulation game is generated. The user equipment 201 displays a game loading screen 202 in a web presentation page in response to the game data loading request. A second server corresponding to the web simulation game obtains user game data from a first server 203 corresponding to a client game based on the game data loading request. Subsequently, the second server calls a game engine 2022 of the web simulation game to generate game scene data according to the user game data. The game engine 2022 is integrated into the game promotion content, and the user game data is data generated in a process in which the user A is playing the client game. When the game scene data is successfully loaded into the user equipment 201, the user equipment 201 switches the displayed game loading screen 202 to a game scene screen 203 that is rendered according to the game scene data. Through a pre-loading process of game scene data, a user terminal can directly perform rendering based on game scene data when a user learns of a client game by using a web simulation game, thereby improving smoothness of a game promotion presentation screen.

A game engine refers to core components of editable computer game systems or interactive real-time graphics applications that have been written. These systems provide game designers with various tools required for writing games, so that the game designer can easily and quickly program games without starting from scratch. Most game engines support a plurality of operating platforms, such as Linux, an Apple operating system (Mac Operating System X, Mac OS X), a Microsoft operating system Windows. The game engine includes the following systems: a rendering engine (that is, "a renderer", including a two-dimensional graphics engine and a three-dimensional graphics engine), a physics engine, a collision detection system, sound effects, a script engine, computer animations, artificial intelligence, a network engine, and scene management. It can be learned that the game engine can present scenes with more complex rendering, thereby improving richness of game promotion content. Through combination of a web page and a game engine, the game engine is written into the web page, so that a part of game promotion content that can be directly displayed is implemented through the web page and a part of the game promotion content that is used for interaction with a user is implemented through the game engine, thereby improving interactivity of game promotion and backend development efficiency.

Figure 3:
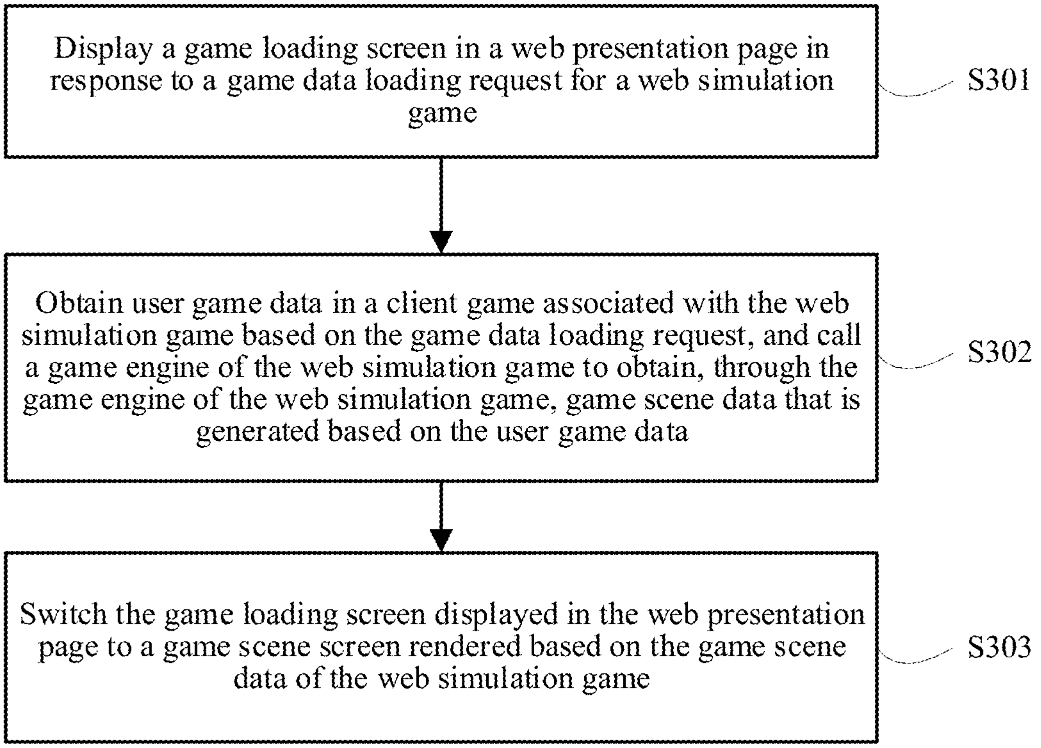
FIG. 3 is a flowchart of a game data processing method according to an embodiment of this application.

Further, referring to FIG. 3, FIG. 3 is a flowchart of a game data processing method according to an embodiment of this application. As shown in FIG. 3, the game data processing method includes the following steps:

Step S301. Display a game loading screen in a web presentation page in response to a game data loading request for a web simulation game.

In this embodiment, user equipment displays the game loading screen in the web presentation page in response to the game data loading request for the web simulation game. The web presentation page is a web page, and the game loading screen is a game image that is generated based on a client game corresponding to the web simulation game. The client game and the web simulation game may be different versions of the same game, or different games associated with each other, for example, game products of the game developer. The game loading screen may be an image pre-written by a server into a computer program at a web front end of the web presentation page. The computer program at the web front end, or briefly referred to as a web front end, is a computer program that is of a web page presented to a user for browsing and that runs on a browser on a user equipment side. When requesting the web presentation page, the user equipment obtains, from the server, and runs, in the browser of the user equipment, the computer program at the web front end, including the game loading screen, to display the web presentation page, and displays the game loading screen in the web page display page. The game loading screen may be generated according to a most frequently used game scene cover and a most frequently used game character image that are extracted from the client game.

For example, the game "GAME FOR PEACE" includes a desert scene, a rainforest scene, a snow scene, and an island scene. A usage frequency of the desert scene is 35%, a usage frequency of the rainforest scene is 25%, a usage frequency of the snow scene is 30%, and a usage frequency of the island scene is 10%. In this case, a game scene cover of the desert scene is obtained, a game character image with the highest usage frequency in the game "GAME FOR PEACE" is obtained, and a game loading screen is generated according to the game scene cover of the desert scene and the game character image. For example, in an RPG, it is assumed that a game character with the highest usage frequency is a healer. In this case, a game character image of the healer may be obtained, and usage frequencies of game instances or usage frequencies of game maps are obtained. A screen in a game instance or a game map with the highest usage frequency is clipped to generate a game loading screen. Only the usage frequencies of the game instances or only the usage frequencies of the game maps may be counted, or both the usage frequencies of the game instances and the usage frequencies of the game maps are counted. This is not limited herein.

In one embodiment, a first server corresponding to the client game may extract the most frequently used game scene cover and the most frequently used game character image from the client game in advance, to generate a game loading screen according to the game scene cover and the game character image. The first server generates the game loading screen according to client game data, and sends the game loading screen to a second server corresponding to the web simulation game. The second server writes the game loading screen into the computer program at the web front end. The first server and the second server may be the same server or may be different servers. When the first server and the second server are the same server, the game loading screen may be directly written into the computer program at the web front end after the game loading screen is generated.

In one embodiment, during the display of the game loading screen in the web presentation page, the user equipment may determine a scene memory capacity of the game scene data requested by the game data loading request and a load memory capacity of loaded data in the game scene data. The scene memory capacity is used for representing a memory size required to be occupied by the game scene data. The load memory capacity is used for representing a memory size occupied by data that has been successfully loaded into the memory based on the game engine. The user equipment determines a loading proportion of the game scene data according to the scene memory capacity and the load memory capacity, and displays the loading proportion in the game loading screen. In one embodiment, the game scene data may be stored in the second server corresponding to the web simulation game. In this case, a memory space occupancy rate of the user equipment can be greatly reduced, so that game promotion content of the client game can be presented in user equipment with poor performance. The game scene data may alternatively be integrated into the game simulation promotion content (referring to the description in FIG. 2), so that the user equipment can present the game promotion content of the client game without a network. In addition, there is no need to transmit data between different computer devices, thereby improving efficiency of loading game data. Due to a small size of memory occupied by the web simulation game, the game scene data does not occupy a particularly large size of memory even if it is integrated into the game simulation promotion content.

Figure 4:
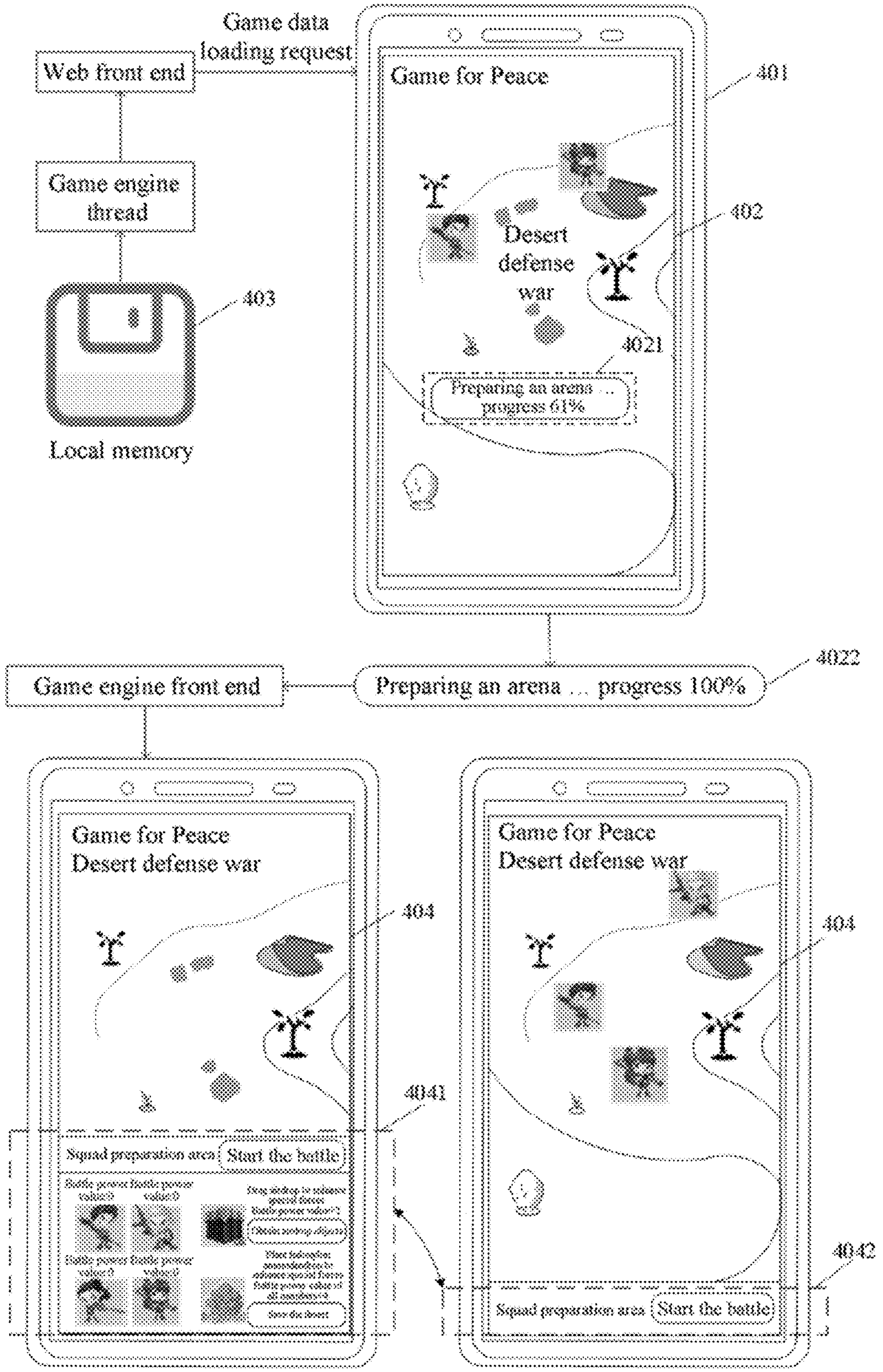
FIG. 4 is a schematic rendering diagram of a game scene according to an embodiment of this application.

Further, referring to FIG. 4, FIG. 4 is a schematic rendering diagram of a game scene according to an embodiment of this application. As shown in FIG. 4, in an example, the game scene data is integrated into the game simulation promotion content. In response to the game data loading request for the web simulation game at the web front end, the user equipment obtains from local memory 403 based on a game engine thread, the game scene data requested by the game data loading request, and feeds back the loading proportion of the obtained game scene data to the web front end. The web front end displays the loading proportion in a load display area 4021 of a game loading screen 402 according to the obtained loading proportion. For example, when it is assumed that the obtained loading proportion is 61%, the loading proportion such as "Preparing an arena . . . progress 61%" is displayed in the load display area 4021. For example, for the implementation of data exchange between the web page and the game engine, reference may be made to the following computer program code 1:

```
the web front end. the game data loading request {
  the game engine {loading the game scene data;
    the web front end. the loading proportion = the loading proportion
of the game scene data;
    if (the game scene data is loaded) {
      render the game scene data; the game engine front end. display
the game scene screen; }
    ...}}
```

where the computer program code 1 is one type of pseudo-code in this embodiment, represents only a type of data exchange between the web page and the game engine, and does not represent an actual code program. The computer program code 1 represents that in this embodiment, data exchange is implemented between the web front end, a web page thread, the game engine thread, and the game engine front end (a part of the game engine running on the user equipment) through respective interfaces. Because the web page and the game engine are integrated, rather than being implemented by separate computer programs, efficiency of data exchange between the web page and the game engine is improved. For example, a game start interface window.minigameData.play( ) and other game logic control interfaces are provided in the game engine. In the web page, the game engine may be called through the interfaces provided in the game engine to implement the data exchange between the game engine and the web page, as shown in computer program code 2:

```
window.gameApi={ };   //The web page calls the game start interface
to start the game
  gameApi.startGame=function( ){ //Web page execution process
    PTTSendClick('gameapi', 'startgame', 'start game api'); //trigger a
call event of the game start interface
    ...window.minigameData.play( );   //call the game start interfaces
provided in the game engine
  }
```

where the computer program code 2 is code of an implementation in this embodiment. For example, when a user clicks on a game promotion content thumbnail to view game promotion content, the user equipment plays the game promotion content (a game video) in the web presentation page. When playing to a preset game trigger location of the game promotion content, the computer program code 2 is executed to automatically trigger the call event of the game start interface, the game engine is called through the game start interface, and the game scene data is obtained through the game engine. Triggering a game start process (for example, gameApi.startGame in the computer program code 2) of the web front end at the preset game trigger location is the game data loading request for the web simulation game. In one embodiment, the displaying a game loading screen in a web presentation page in response to a game data loading request for a web simulation game may be in the game start process of the web front end, calling the game engine through the game start interface based on the call event of the game start interface and displaying the game loading screen in the web presentation page through the game engine; or may be displaying, by the web front end, the game loading screen in the web presentation page based on the game start process, then triggering the call event of the game start interface, calling the game engine through the game start interface, and performing step S302 based on the game engine.

In this embodiment, two threads are included, one is a web page thread, and the other is a game engine thread. The web page thread is used for processing data associated with the web front end. The game engine thread is used for processing data associated with the game engine front end. Through the web page thread and the game engine thread, a page that needs to be displayed in this application is rendered at the backend (for example, the second server), and a rendering result is fed back to the corresponding front end (the web front end or the game engine front end) (on the user equipment), so that the corresponding front end displays a corresponding screen in the page according to the obtained rendering result. For example, the game scene data is processed at the backend based on the game engine thread to obtain a rendering result corresponding to the game scene data. Then, the backend feeds back the rendering result to the game engine front end, and the game engine front end displays the game scene screen according to the rendering result. The web page thread and the game engine thread are started at the backend to process data, so that a response speed of the front end is improved, system resources are fully utilized, and efficiency of processing game data in this application is improved. Simultaneous execution of a plurality of threads can maximize hardware performance, thereby increasing a speed of data exchange between the game engine and the web page.

Step S302. Obtain user game data in a client game associated with the web simulation game based on the game data loading request, and call a game engine of the web simulation game to obtain, through the game engine of the web simulation game, game scene data that is generated based on the user game data.

In this embodiment, the user equipment obtains, based on the game data loading request, the user game data in the client game associated with the web simulation game, the user game data being stored in the first server corresponding to the client game. In one embodiment, the user game data may alternatively be stored in a computer device where login user information (information about a user that has logged in to the web simulation game) corresponding to the web simulation game is located. When the user equipment does not obtain the user game data (indicating that the user corresponding to the login user information of the web simulation game has not used the client game) in the client game, the game engine of the web simulation game is called to obtain initial simulation data, and the initial simulation data is used as the game scene data. In one embodiment, the first server may send the user game data related to the client game to the second server corresponding to the web simulation game. The second server generates the game scene data according to the user game data. The user equipment directly obtains the game scene data from the second server through the game engine. The client game is a published game of the web simulation game, that is, the web simulation game is used for publicizing the client game.

In one embodiment, the initial simulation data may include at least two data packets. During obtaining of the game scene data, the user equipment calls the game engine to obtain an $i^{th}$ data packet from the second server corresponding to the web simulation game; i being a positive integer, and i being less than or equal to the number of the at least two data packets. The user equipment obtains a transmission timestamp carried in the $i^{th}$ data packet, and adds the $i^{th}$ data packet to to-be-rendered game data based on the transmission timestamp. The to-be-rendered game data includes a data packet that is in the initial simulation data and that has been obtained from the second server. The transmission timestamp is used for representing a time at which the $i^{th}$ data packet is initially transmitted by the second server during transmission of the initial simulation data. The user equipment generates the game scene data according to the user game data and the initial simulation data. For example, when the second server sends the $i^{th}$ data packet in the initial simulation data to the user equipment for the first time, the $i^{th}$ data packet carries a transmission timestamp "10:25:30". When the second server obtains a message indicating that the $i^{th}$ data packet fails to be sent, the second server sends the $i^{th}$ data packet in the initial simulation data to the user equipment for the second time, and the transmission timestamp carried in the $i^{th}$ data packet is still "10:25:30". In other words, when the second server sends the initial simulation data to the user equipment, each data packet in the initial simulation data carries a transmission timestamp, and these transmission timestamps are times at which the second server initially sends the data packets.

Figure 5A:
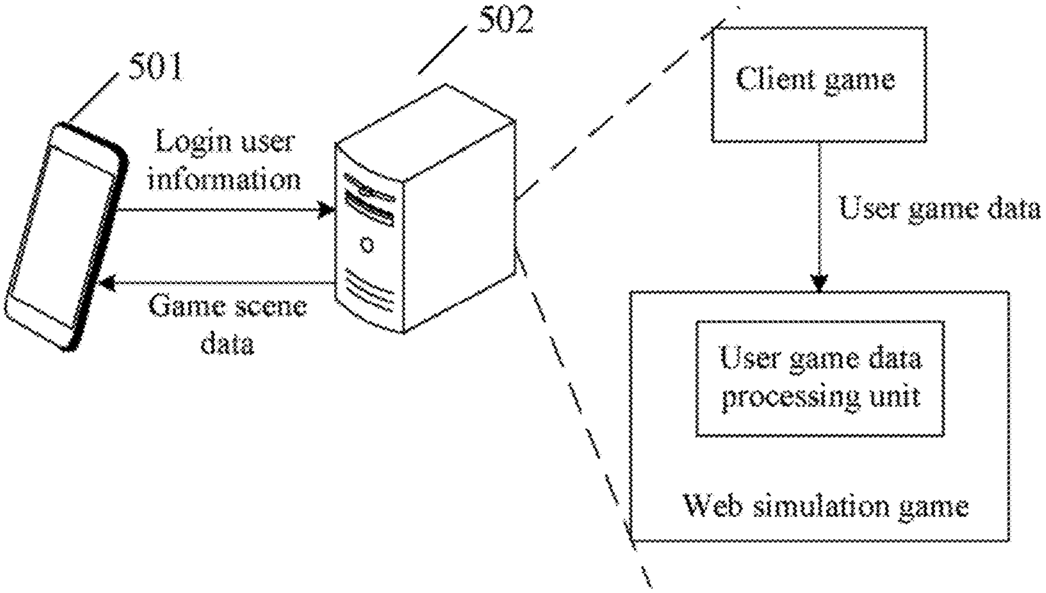
FIG. 5A and FIG. 5B are each a schematic diagram of a game scene data generation process according to an embodiment of this application.
Figure 5B:
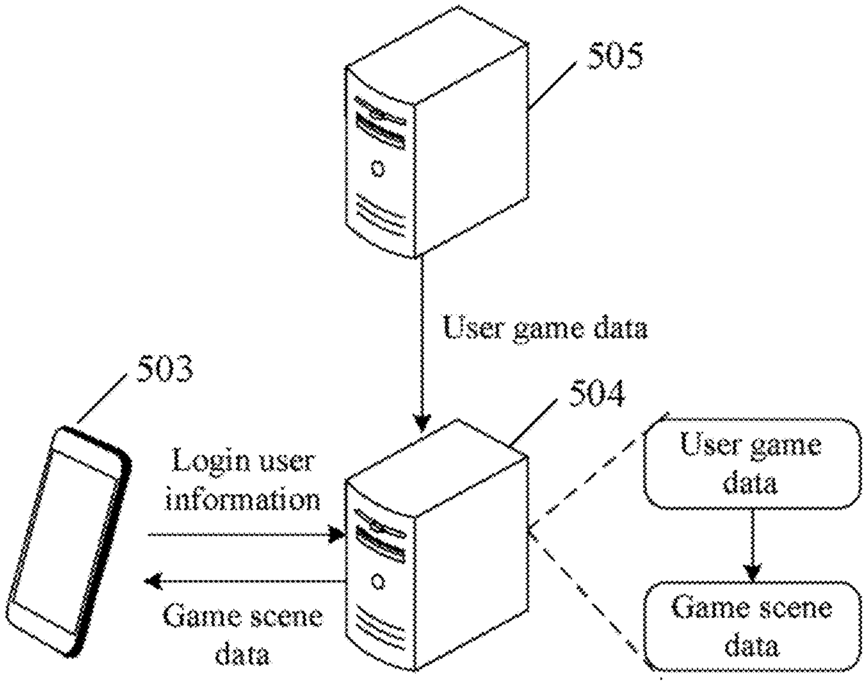

Referring to FIG. 5A and FIG. 5B, FIG. 5A and FIG. 5B are each a schematic diagram of a game scene data generation process according to an embodiment of this application. As shown in FIG. 5A, it is assumed that a first server and a second server are the same server. User equipment 501 sends login user information of a web simulation game to a second server 502 based on a game data loading request. The second server 502 includes two parts: a client game and the web simulation game. The second server 502 obtains user game data of a login user from the client game according to the login user information, inputs the user game data into the web simulation game part, converts the user game data into game simulation parameters by using a user game data processing unit in the web simulation game part, and then adds the game simulation parameters into initial simulation data to generate game scene data of the web simulation game. The second server 502 sends the game scene data to the user equipment 501. The user equipment 501 loads the game scene data based on a game engine. The initial simulation data is data in the web simulation game that has not been combined with the user game data, such as game background data or basic data in game object data. Simply, the web simulation game may include a computer program related to the logic of "initial simulation data.update (game simulation parameters=conversion (user game data);)".

As shown in FIG. 5B, it is assumed that a first server and a second server are different servers. User equipment 503 sends login user information to a second server 504. The second server 504 obtains user game data of a login user from a first server 505 according to the login user information, converts the user game data into game simulation parameters, updates initial simulation data according to the game simulation parameters, generates game scene data, and sends the game scene data to the user equipment 503. The user equipment 503 loads the game scene data based on a game engine.

In one embodiment, in FIG. 5A or FIG. 5B, the user game data may be pre-converted. That is, the second server obtains at least two pieces of user game data in the client game from the first server according to a user data update period, and separately converts the at least two pieces of user game data into game simulation parameters. One game simulation parameter corresponds to one piece of login user information. When the second server 502(504) obtains the login user information sent by the user equipment 501(503), it is assumed that the login user information is login user information 1. The second server 502(504) obtains a game simulation parameter 1 corresponding to the login user information 1, updates the initial simulation data according to the game simulation parameter 1, generates game scene data, and sends the game scene data to the user equipment 501(503). In one embodiment, after obtaining the game simulation parameter 1, the second server 502(504) sends the game simulation parameter 1 to the user equipment 501(503). The user equipment 501(503) calls the game engine, inputs the game simulation parameter 1 into the initial simulation data based on the game engine, updates the initial simulation data, and generates the game scene data. When the user equipment 501(503) does not obtain the game scene data and does not obtain the game simulation parameter, the user equipment 501(503) uses the initial simulation data as the game scene data. In one embodiment, the second server may directly send the user game data to the user equipment. The user equipment converts the user game data into a game simulation parameter based on the game engine, updates the initial simulation data according to the game simulation parameter, and generates the game scene data. In one embodiment, the user equipment may directly obtain the user game data from the first server, and generates the game scene data based on the user game data. In this case, the user game data does not need to be forwarded through the second server during obtaining, the efficiency of obtaining the user game data can be improved. A data conversion logic algorithm is used during conversion of the user game data into a game simulation parameter. The data conversion logic algorithm is used for extracting a game data feature value from the user game data, and converting the game data feature value into a game simulation parameter acceptable or usable for the initial simulation data.

In one embodiment, the user equipment obtains the login user information of the web simulation game, and obtains user game ciphertext corresponding to the login user information from the client game. The user game ciphertext is obtained by the first server corresponding to the client game by encrypting the user game data by using a local public key corresponding to the login user information. The user equipment decrypts the user game ciphertext by using a local private key to obtain the user game data. In one embodiment, the user game ciphertext may alternatively be obtained by the second server corresponding to the web simulation game by encrypting the user game data. Specifically, the user equipment may generate a pair of keys according to the login user information by using an encryption algorithm. When the user equipment obtains the user game data from the first server, the user equipment sends the local public key to the first server. When the user equipment obtains the user game data from the second server, the user equipment sends the local public key to the second server. To send original data to the user equipment, the first server or the second server may encrypt the to-be-sent original data by using the local public key of the user equipment, and send the encrypted original data to the user equipment. The user equipment decrypts the received encrypted original data by using the local private key to obtain the original data sent by the first server or the second server. The original data may be any data sent by the first server or the second server to the user equipment. For example, the second server sends a game simulation parameter to the user equipment. In this case, the game simulation parameter is encrypted by using the local public key of the user equipment, and the encrypted game simulation parameter is sent to the user equipment. The user equipment may decrypt the encrypted game simulation parameter by using the local private key to obtain the game simulation parameter.

In one embodiment, the user game data in the client game is obtained based on the game data loading request, and a data loading interface (for example, the game start interface in the computer program code 2) associated with the game data loading request in the game engine is obtained. Data communication is established based on the data loading interface and the game engine, the game engine is called based on the data communication, and the user game data is sent to the game engine. The game scene data is generated according to the user game data based on the game engine. In one embodiment, for the process of generating game scene data according to user game data, reference may be made to the related description shown in FIG. 5A or FIG. 5B.

For example, the client game is "GAME FOR PEACE." The user game data associated with the login user information in the client game is obtained. The user game data includes user game duration, user game achievements, and user experience points. The login user information corresponds to a user A. It is assumed that it is determined according to the user game data that during the game, the user A primarily shoots enemies, secondarily collects items, and thirdly defends against damage. A battle power bonus of the user A is determined based on the data conversion logic algorithm according to experience points of the user A in the user game data, and the battle power bonus is added to a battle power value of a game virtual character in the initial simulation data according to a behavior percentage of each user behavior feature. One game virtual character may correspond to one user behavior feature. For example, a behavior percentage of shooting enemies is 45%, a behavior percentage of collecting items is 30%, a behavior percentage of defending against damage is 25%, and an obtained battle power bonus is 2000. It is assumed that in the web simulation game, a game virtual character 1 focuses on attacking and corresponds to the user behavior feature of shooting enemies, a game virtual character 2 focuses on collection and corresponds to the user behavior feature of collecting items, and a game virtual character 3 focuses on defending and corresponds to the user behavior feature of defending against damage. 45% of the battle power bonus (a battle power bonus value of 900) is added to a battle power value of the game virtual character 1. 30% of the battle power bonus (a battle power bonus value of 600) is added to a battle power value of the game virtual character 2. 25% of the battle power bonus (a battle power bonus value of 500) is added to a battle power value of the game virtual character 3. In one embodiment, alternatively, a game auxiliary tool may be issued to the user A in the web simulation game according to the experience points of the user A in the user game data. The foregoing is an implementation of updating the initial simulation data based on the user game data. Different data conversion logic algorithms may be set according to specific needs. This is not limited herein.

For example, the client game is an RPG. User game data of a user A is obtained. A usage frequency of each game use character used by the user A in the client game is obtained based on the data conversion logic algorithm, and level information of the user A is obtained. The user equipment determines a character damage bonus based on the level information, and adds the character damage bonus to a battle power value of each game virtual character in the web simulation game according to the usage frequency of each game use character. The game virtual character corresponds to the game use character. For example, the game use character includes a healer, a shooter, and a swordsman, and the game virtual character also includes a healer, a shooter, and a swordsman. For example, a level in the obtained level information of the user A is level 90. In this case, it is determined according to the level information (the level and experience points) of the user A that a character damage bonus is 500. If a usage frequency of the healer is 50%, a usage frequency of the shooter is 20%, and a usage frequency of the swordsman is 30%, 50% of the character damage bonus (a character damage bonus value of 250) is added to a battle power value of the healer, 20% of the character damage bonus (a character damage bonus value of 100) is added to a battle power value of the shooter, and 30% of the character damage bonus (a character damage bonus value of 150) is added to a battle power value of the swordsman.

The foregoing examples about the game "GAME FOR PEACE" and the RPG are implementations of updating initial simulation data based on user game data. Different data conversion logic algorithms may be set according to specific needs. This is not limited herein. The client game may alternatively be other types of games.

Step S303. Switch the game loading screen displayed in the web presentation page to a game scene screen rendered based on the game scene data of the web simulation game. The game scene screen is used for responding to a game interactive operation associated with the web simulation game.

Figure 6:
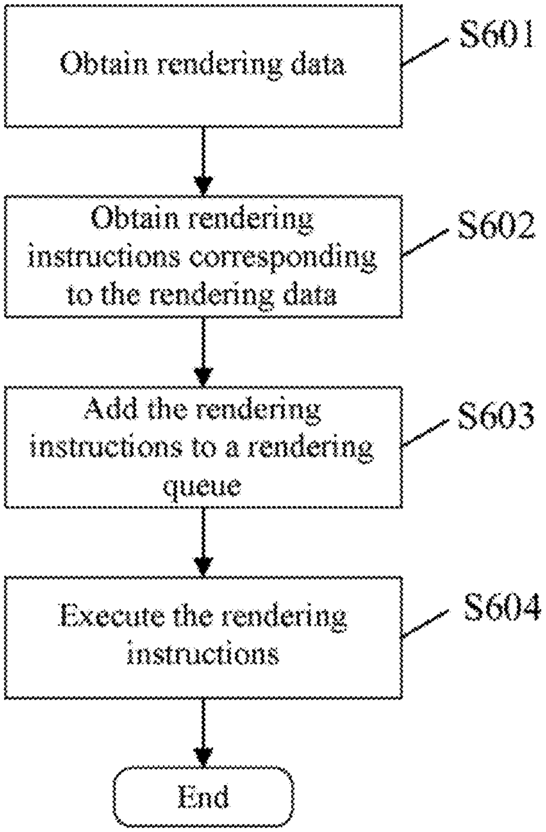
FIG. 6 is a flowchart of screen rendering of a game scene according to an embodiment of this application.

In this embodiment, the user equipment may obtain rendering data corresponding to pixels from the game scene data based on the game engine, and determine rendering instructions corresponding to the rendering data; sort the rendering instructions based on rendering locations of the pixels in the web presentation page, and sequentially add the sorted rendering instructions to a rendering queue; and obtain rendering types of the rendering instructions, execute the rendering instructions in the rendering queue based on the rendering types, and switch, based on the rendering instructions, the game loading screen to the game scene screen for display. For the rendering process of the game scene screen, reference may be made to FIG. 6. FIG. 6 is a flowchart of screen rendering of a game scene according to an embodiment of this application. The process includes the following steps:

Step S601. Obtain rendering data.

Specifically, the user equipment triggers a rendering process of the game scene screen to draw the game scene screen in the web presentation page. Each pixel in the game scene screen is denoted as a node. The user equipment accesses data of each pixel in memory to obtain rendering data, and starts to draw the pixel after accessing all the pixels in the game scene screen. For example, the user equipment executes "Node::visit( )" to recursively call visit( ) (access instruction) for all the pixels Nodes, and executes this→draw( ) (pixel drawing instruction) after the recursion ends.

Step S602. Obtain rendering instructions corresponding to the rendering data.

Specifically, the obtained rendering instructions for the rendering data include a node drawing instruction DrawNode, a sprite drawing instruction Sprite, and the like.

Step S603. Add the rendering instructions to a rendering queue.

Specifically, the user equipment may sort the rendering instructions corresponding to the pixels based on rendering locations (that is, locations in the game scene screen) of the pixels in the web presentation page, and sequentially add the sorted rendering instructions to the rendering queue.

Step S604. Execute the rendering instructions.

Specifically, the user equipment obtains rendering types of the rendering instructions and rendering functions corresponding to the rendering types, and executes the corresponding rendering instructions based on the rendering functions. After executing all the rendering instructions, the user equipment switches the displayed game loading screen to the game scene screen. In one embodiment, the game loading screen may be hidden and then the game scene screen is displayed in the web presentation page, or the game loading screen is directly covered with the game scene screen. In one embodiment, the rendering types may include the following several types:

1. rendering triangle type (triangles command);
2. rendering three-dimensional (3D) type;
3. creating rendering branch type;
4. customizing rendering commands;
5. rendering a plurality of graphics using the same texture at the same time; and
6. rendering customized primitives and the like.

In one embodiment, the rendering types are determined according to rendering instructions used in the game engine, and are not limited to the six rendering types mentioned above.

In one embodiment, the game scene data includes game background data and game object data. During rendering of the game scene screen, the user equipment switches, in the web presentation page, the game loading screen to a game background screen obtained through rendering based on the game background data; determines an object presentation area in the game background screen, and renders a game presentation object in the object presentation area according to the game object data; and determines the game background screen including the game presentation object as the game scene screen. In one embodiment, the game background data belongs to the initial simulation data, and location information of the object presentation area in the game background screen also belongs to the initial simulation data, that is, the user game data is used for updating some parameters in the initial simulation data. For example, referring to FIG. 4, when the loading of the game scene data is completed, a loading proportion displayed in the load display area 4021 is 100%. For example, proportion display data 4022 that reads "Preparing an arena . . . progress 100%" is displayed in the load display area 4021. The user equipment calls a game engine front end. The game engine front end displays a game scene screen 404 in the web presentation page, determines an object presentation area 4041 in the game scene screen 404, and renders a game presentation object in the object presentation area 4041.

Further, the user equipment hides the object presentation area 4041 in response to a hide operation for the object presentation area 4041, and displays an object presentation area label 4042 in the game scene screen. When the object presentation area label 4042 is triggered, the object presentation area 4041 is displayed in the game scene screen 404 in response to a trigger operation for the object presentation area label 4042.

When the game presentation object is rendered in the object presentation area in the game scene screen, details are as follows:

In one embodiment, the game object data includes character data and auxiliary tool data, and the game presentation object includes a game virtual character and a game auxiliary tool. When rendering the game presentation object in the object presentation area according to the game object data, the user equipment determines a character presentation area in the object presentation area, and renders the game virtual character in the character presentation area according to the character data; and determines a tool presentation area in the object presentation area, and renders the game auxiliary tool in the tool presentation area according to the auxiliary tool data.

In one embodiment, when rendering the game virtual character in the character presentation area according to the character data, the user equipment obtains character image information and character recommendation degrees from the character data, and sorts the character image information based on the character recommendation degrees; and sequentially renders game virtual characters corresponding to the character image information in the character presentation area based on the sorted character image information. The character recommendation degree is generated based on the user game data. When the user equipment does not obtain the user game data, the character recommendation degree is a recommended default value in the initial simulation data. When the user game data is obtained, the recommended default value in the initial simulation data is updated according to a game simulation parameter obtained through conversion from the user game data to obtain the character recommendation degree. For example, in step S302, the battle power value of the game virtual character in the game "GAME FOR PEACE" or the battle power value of the game virtual character in the RPG may be used as a character recommendation degree of the corresponding game virtual character. In one embodiment, the second server of the web simulation game may obtain user game data of all players in the corresponding client game, and generate recommended default values in the initial simulation data according to the user game data of all the players. Using the game "GAME FOR PEACE" as an example, it is assumed that the recommended default value is 0. After the initial simulation data is updated according to the user game data, a battle power value of 900 of a game virtual character 1 is obtained, a battle power value of 600 of a game virtual character 2 is obtained, and a battle power value of 500 of a game virtual character 3 is obtained, that is, a character recommendation degree of the game virtual character 1 is 900, a character recommendation degree of the game virtual character 2 is 600, and a character recommendation degree of the game virtual character 3 is 500. The user equipment sorts the game virtual characters based on the character recommendation degrees, obtains a sorting result in an order of the game virtual character 1, the game virtual character 2, and the game virtual character 3, and then sequentially renders the game virtual character 1, the game virtual character 2, and the game virtual character 3 in the character presentation area according to character image information of the game virtual characters.

In one embodiment, when rendering the game auxiliary tool in the tool presentation area according to the auxiliary tool data, the user equipment determines a tool data amount of the game auxiliary tool based on the auxiliary tool data, and obtains tool description information of the game auxiliary tool. When the tool data amount is zero, in the tool presentation area, the game auxiliary tool with a first display state is rendered according to the auxiliary tool data and the tool description information of the game auxiliary tool is displayed. The first display state is used for representing failure of the game auxiliary tool. The first display state may be a state of not being displayed, or may be a state of being displayed but non-triggerable. For example, when the tool data amount is zero, the game auxiliary tool is not displayed in the tool presentation area, or the game auxiliary tool is displayed in grayscale in the tool presentation area and the game auxiliary tool is non-triggerable in this case. When the tool data amount is at least one, in the tool presentation area, the game auxiliary tool with a second display state is rendered according to the auxiliary tool data and the tool description information of the game auxiliary tool is displayed. The second display state is used for representing validity of the game auxiliary tool. A tool data amount of each game auxiliary tool may be obtained according to the user game data. When the user equipment does not obtain the user game data, the tool data amount is a default value (for example, 0) of a tool number in the initial simulation data. When the user game data is obtained, the default value of the tool number in the initial simulation data is updated according to a game simulation parameter obtained through conversion from the user game data to obtain the tool data amount. The game auxiliary tool may be issued to the login user information of the web simulation game of the user equipment according to the user game data. In one embodiment, alternatively, a tool obtaining label associated with the game auxiliary tool may be displayed in the tool presentation area; and a task option for obtaining the game auxiliary tool may be displayed in a task display page in response to a trigger operation for the tool obtaining label, the task display page being independently displayed in the web presentation page.

Figure 7:
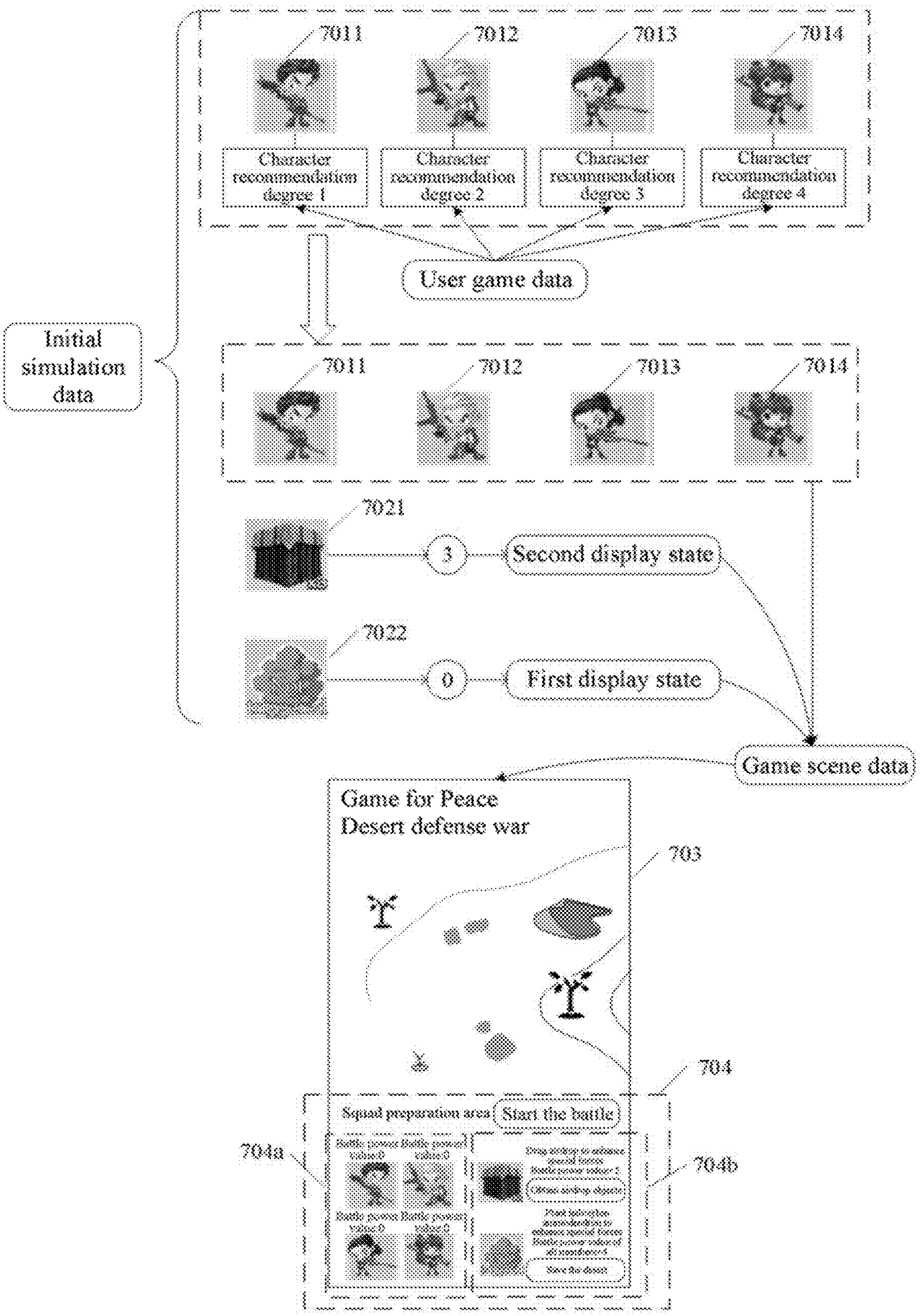
FIG. 7 is a schematic diagram of a rendering scenario of an object presentation area according to an embodiment of this application.

In one embodiment, referring to FIG. 7, FIG. 7 is a schematic diagram of a rendering scenario of an object presentation area according to an embodiment of this application. As shown in FIG. 7, the initial simulation data obtained by the user equipment includes a game virtual character 7011, a game virtual character 7012, a game virtual character 7013, and a game virtual character 7014. It is assumed that recommended default values of the game virtual character 7011, the game virtual character 7012, the game virtual character 7013, and the game virtual character 7014 are all 0. The user equipment obtains a game auxiliary tool 7021 and a game auxiliary tool 7022 included in the initial simulation data. Default values of tool numbers of the game auxiliary tool 7021 and the game auxiliary tool 7022 are both 0. The user equipment updates the initial simulation data according to the user game data, and obtains a character recommendation degree 1 of the game virtual character 7011, a character recommendation degree 2 of the game virtual character 7012, a character recommendation degree 3 of the game virtual character 7013, and a character recommendation degree 4 of the game virtual character 7014. The user equipment sorts the game virtual character 7011, the game virtual character 7012, the game virtual character 7013, and the game virtual character 7014 based on the character recommendation degree 1, the character recommendation degree 2, the character recommendation degree 3, and the character recommendation degree 4. It is assumed that the character recommendation degree 1, the character recommendation degree 2, the character recommendation degree 3, and the character recommendation degree 4 are all 0, the user equipment randomly sorts the game virtual characters, or directly determines a sorting result of the game virtual characters according to a default sorting order. It is assumed that the sorted game virtual characters are sequentially the game virtual character 7011, the game virtual character 7012, the game virtual character 7013, and the game virtual character 7014.

The user equipment updates the initial simulation data according to the user game data to obtain a tool data amount of 3 of the game auxiliary tool 7021 and a tool data amount of 0 of the game auxiliary tool 7022. In this case, it may be determined that a display status of the game auxiliary tool 7021 is a second display state, and a display status of the game auxiliary tool 7022 is a first display state.

The user equipment obtains the game scene data after updating the initial simulation data according to the user game data, and displays a game scene screen 703 in the web presentation page according to the game scene data. The user equipment displays a game background screen, determines an object presentation area 704 in the game background screen, and determines a character presentation area 704*a* and a tool presentation area 704*b* in the object presentation area 704. The game background screen and the object presentation area 704 constitute the game scene screen. In one embodiment, the user equipment sequentially renders the game virtual character 7011, the game virtual character 7012, the game virtual character 7013, and the game virtual character 7014 in the object presentation area 704. In one embodiment, the user equipment may further display a character recommendation degree of each game virtual character. Further, each game virtual character displayed in the character presentation area 704*a* may be displayed through a character card. Each game virtual character can be triggered. When the game virtual character is triggered, a related description of the game virtual character, such as a skill and a battle power value of the game virtual character, is displayed.

In one embodiment, the game auxiliary tools are displayed in the tool presentation area 704*b*. A tool display order of the game auxiliary tools may be determined according to the tool data amounts of the game auxiliary tools and the game auxiliary tools are sequentially displayed based on the tool display order, or a tool display order of the game auxiliary tools may be determined according to tool categories of the game auxiliary tools and the game auxiliary tools are sequentially displayed based on the tool display order. For example, if the tool data amount of the game auxiliary tool 7021 is 3, and the tool data amount of the game auxiliary tool 7022 is 0, it is determined that the tool display order of the game auxiliary tools is the game auxiliary tool 7021 and the game auxiliary tool 7022. In one embodiment, tool description information and a tool data amount of the game auxiliary tool may alternatively be displayed in a presentation sub-area where the game auxiliary tool is located. As shown in FIG. 7, in the presentation sub-area 1 where the game auxiliary tool 7021 is located, the tool description information of the game auxiliary tool 7021 that reads “Drag airdrop to enhance special forces and a battle power value+2” and a tool data amount “3” are displayed. In the presentation sub-area 2 where the game auxiliary tool 7022 is located, the tool description information of the game auxiliary tool 7022 that reads “Plant haloxylon ammodendron to enhance special forces and a battle power value of all members+4” and a tool data amount “0” are displayed.

A running process of the web simulation game is as follows:

After displaying the game scene screen in the web presentation page, the user equipment displays, in the game scene screen in response to a game configuration operation for the game scene screen, a target game virtual character corresponding to the game configuration operation. The game configuration operation may correspond to one or at least two target game virtual characters. The user equipment generates a to-be-triggered game virtual character based on the game engine, and displays the to-be-triggered game virtual character in the game scene screen. The to-be-triggered game virtual character and the target game virtual character belong to different camp sets. In one embodiment, the to-be-triggered game virtual character may be a character generated according to a real player in the client game, or may be a character generated through game artificial intelligence. This is not limited herein. The user equipment triggers the to-be-triggered game virtual character based on the target game virtual character in response to a trigger operation for the to-be-triggered game virtual character, determines a game score according to the triggered to-be-triggered game virtual character, obtains a character identifier of the triggered to-be-triggered game virtual character, and adds the character identifier to a set of triggered characters. The set of triggered characters stores character identifiers of all to-be-triggered game virtual characters triggered by the login character information (information about a character that has logged in to the web simulation game in the user equipment, or character information corresponding to the login user information), and can be used for detecting the game score. In one embodiment, the game score may alternatively be displayed in the game scene screen, so that the user corresponding to the user equipment can obtain a score obtained in a current round of game.

In one embodiment, an initial value of the game score is 0. In the user equipment, each time a to-be-triggered game virtual character is triggered, a character score corresponding to the to-be-triggered game virtual character is determined according to to-be-triggered character information of the to-be-triggered game virtual character, and the character score is added to the game score, until the current round of game ends. For example, the to-be-triggered character information may include hit points and damage points of the corresponding to-be-triggered game virtual character. A to-be-triggered game virtual character with higher hit points or damage points corresponds to a higher character score. Specifically, the user equipment may obtain parameter weights of character parameters in the to-be-triggered character information, perform a weighted summation on the character parameters based on the parameter weights, and determine the character score corresponding to the to-be-triggered game virtual character according to a weighted summation result. In one embodiment, a character score corresponding to each to-be-triggered game virtual character may be preset.

For example, a to-be-triggered game virtual character 1, a to-be-triggered game virtual character 2, a to-be-triggered game virtual character 3, and a to-be-triggered game virtual character 4 are generated in the web simulation game corresponding to the game “GAME FOR PEACE.” A character score corresponding to the to-be-triggered game virtual character 1 is 20. A character score corresponding to the to-be-triggered game virtual character 2 is 10. A character score corresponding to the to-be-triggered game virtual character 3 is 10. A character score corresponding to the to-be-triggered game virtual character 4 is 20. In response to a trigger operation for the to-be-triggered game virtual character 1, when the to-be-triggered game virtual character 1 is triggered (hit points are reset), the user equipment updates a game score to 20, and adds a character identifier of the to-be-triggered game virtual character 1 to a set of triggered characters; . . . , until the current round of game ends. Assuming that the to-be-triggered game virtual character 1 and the to-be-triggered game virtual character 2 are triggered, a game score obtained in the current round of game is 30. In this case, the set of triggered characters includes a character identifier of the to-be-triggered game virtual character 1 and a character identifier of the to-be-triggered game virtual character 2.

When the current round of game ends, that is, the web simulation game stops running, the user equipment obtains running data of the web simulation game. The running data includes a game identifier, the game score, the number of triggered characters, a game end timestamp, and the set of triggered characters. The running data is the running data of the current round of game. In one embodiment, the running data may further include the login user information in the web simulation game. The user equipment generates a game matching signature according to the game identifier, the game score, and the game end timestamp; and sends the game identifier, the game score, the number of triggered characters, the game end timestamp, the set of triggered characters, and the game matching signature to a second server. The second server verifies validity of the obtained running data. The second server determines the running data as invalid data when the verification of the running data fails. The game identifier, the game score, and the game end timestamp are used for verifying validity of the game matching signature. The set of triggered characters and the number of triggered characters are used for verifying validity of the game score. The second server is a server corresponding to the web simulation game. Specifically, the second server generates a verification signature according to the game identifier, the game score, and the game end timestamp, and determines a verification score according to the set of triggered characters and the number of triggered characters. If the verification signature is the same as the game matching signature and the verification score is the same as the game score, the running data is determined as valid data. If the verification signature is different from the game matching signature or the verification score is different from the game score different, the running data is determined as invalid data, and the running data is discarded. In one embodiment, running parameters included in the running data may be determined according to the web simulation game. A running data verification method used by the second server to verify the validity of the running data may be determined according to the running parameters included in the running data.

In one embodiment, the second server may count the number of invalid times of the user corresponding to the login user information. The number of invalid times refers to the number of times that the running data of the user is invalid data. When the number of invalid times is greater than an invalid threshold, permission of the user to use the web simulation game and the client game is canceled. In one embodiment, the permission of the user to use the web simulation game and the client game may be canceled within a specified period of time.

In one embodiment, a verification result of the second server for the running data is obtained. If the verification result is a verification success result, the running data is determined as valid data, login user information of the web simulation game is obtained, and the running data and the login user information are sent to a first server corresponding to the client game, so that the first server sends game virtual assets to a user account corresponding to the login user information based on the running data. The user account is an account associated with the login user information in the client game. In one embodiment, the process may alternatively be implemented by the second server. When the verification result of the second server for the running data is a verification success result, the running data is determined as valid data, login user information of the web simulation game is obtained, and the running data and the login user information are sent to a first server corresponding to the client game. In one embodiment, when the running data includes login user information, the user equipment (or the second server) may directly send the running data to the first server after determining the running data as valid data. In one embodiment, if the first server does not obtain the user account, the first server caches the login user information and the game virtual assets. When a cache time of the login user information and the game virtual assets exceeds a specified cache time, the login user information and game virtual assets are deleted. The second server may further cache running data of each user of the web simulation game, so that when a user subsequently enters the web simulation game, the user can continue to run the web simulation game based on previous running data.

In one embodiment, after obtaining the running data, the first server sends the game virtual assets to the user account corresponding to the login user information according to the game score and the like in the running data. The game virtual assets may include, but are not limited to, experience points, game virtual currency, a game virtual tool, or the like. The user game data in the client game is integrated into the web simulation game, and the client game is updated through the running data of the web simulation game, so that the interaction between the web simulation game and the client game is implemented, thereby improving the utility of game promotion.

In this embodiment, a game loading screen is displayed in a web presentation page in response to a game data loading request for a web simulation game; user game data in a client game is obtained based on the game data loading request, and a game engine is called to obtain, from the game engine, game scene data generated based on the user game data, the client game being a published game corresponding to the web simulation game; and the game loading screen displayed in the web presentation page is switched to a game scene screen rendered based on the game scene data; the game scene screen being used for responding to a game interactive operation associated with the web simulation game. Through integration of a web page and a game engine, promotion of a game is implemented, a related description of the game can be displayed, and interaction with a user can be implemented. In addition, data of the user in a real game (the client game) is obtained and the data is combined with the promotion of the game, so that a page presented by the promotion of the game is more realistic, thereby improving user experience and improving richness of game promotion content. Moreover, the web simulation game is a game used for promotion and generated based on the client game, and occupies a small memory space, thereby saving resources. In addition, fluency of game promotion presentation screens is improved by preloading data before rendering.

Figure 8:
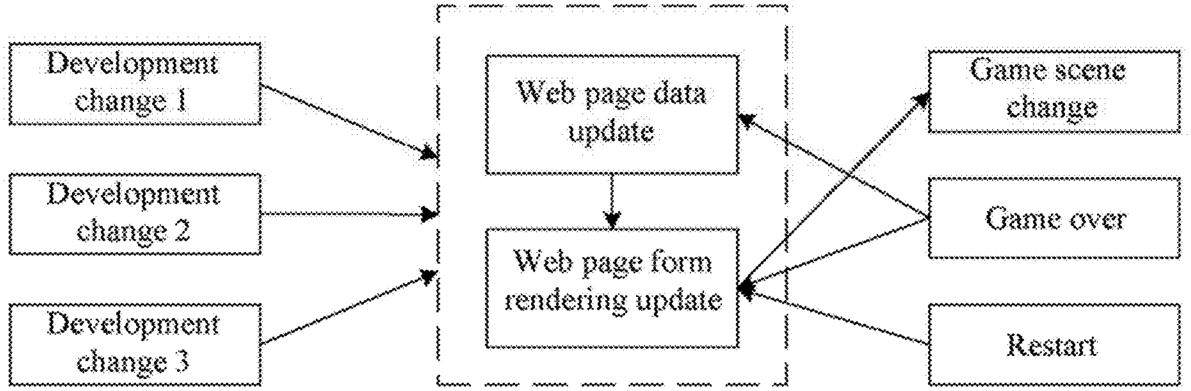
FIG. 8 is a schematic update diagram of game data according to an embodiment of this application.

Further, reference may be made to FIG. 8, and FIG. 8 is a schematic update diagram of game data according to an embodiment of this application. As shown in FIG. 8, when an event corresponding to a development change 1, a development change 2, or a development change 3 occurs, web page data is updated according to relevant data of the development change, and web page form rendering, that is, a related display screen of game promotion content, is updated according to the web page data. When the web simulation game ends, the web page data may be updated according to the running data in the web simulation game, and the web page form rendering is updated according to the web page data. When the web simulation game is restarted, the web page form rendering may be updated. The update of the web page form rendering may cause a game scene change.

Figure 9:
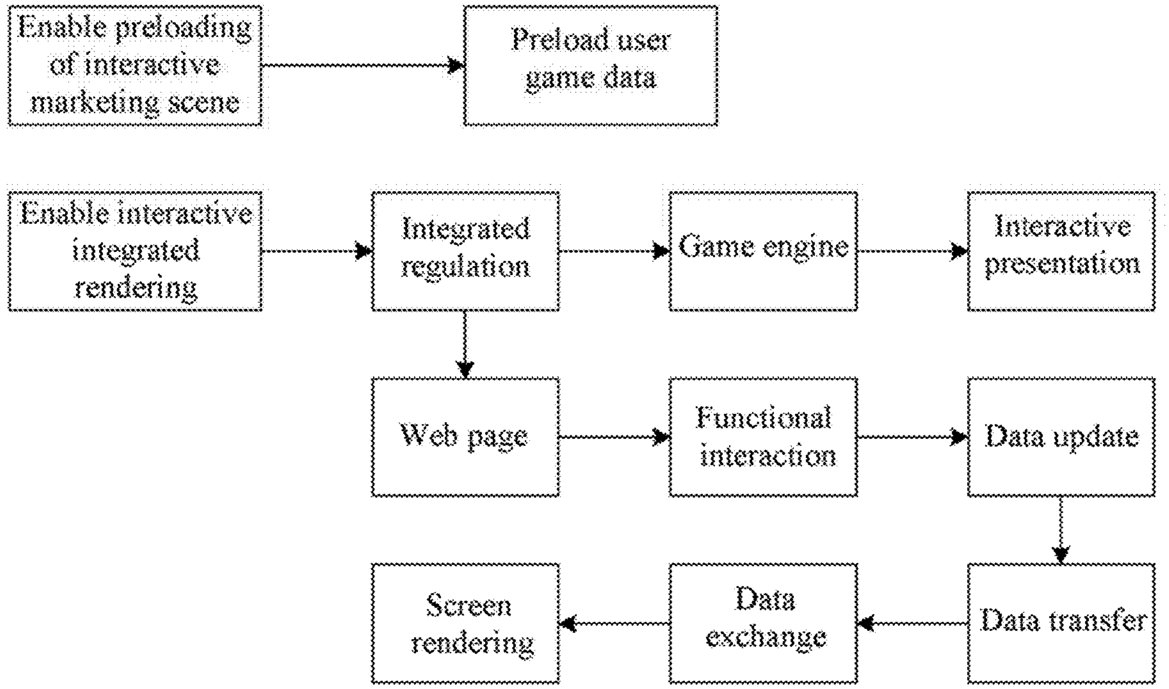
FIG. 9 is a schematic update flowchart of game data according to an embodiment of this application.

Further, referring to FIG. 9, FIG. 9 is a schematic update flowchart of game data according to an embodiment of this application. As shown in FIG. 9, preloading of an interactive marketing scene is enabled to preload user game data, so that screen rendering is smoother during formal rendering of the web simulation game. During running of the web simulation game, interactive integrated rendering is enabled to perform integrated regulation. The integrated regulation includes a game engine thread and a web page thread. The game engine thread is used for processing data related to the game engine. The web page thread is used for processing data related to the web page. The game engine is used for implementing interactive presentation, that is, interaction between a user and game promotion content, which improves participation of the user, thereby improving richness of game promotion forms. The web page implements functional interaction, used for responding to a trigger operation for some functions in a displayed screen, implements data update, and enables data transfer, to implement data exchange between the game engine and the web page and between a front end and a backend, thereby improving data transmission efficiency during game promotion. In addition, the web page may further implement screen rendering, such as rendering of the game loading screen. In one embodiment, the game engine may further obtain device performance of user equipment. When the device performance is relatively poor, obtained data (such as game scene data) may be filtered to discard part of the data, to better adapt to the device performance of the user equipment and improve data processing efficiency. The discarded part of the data may be data for improving a screen display effect, that is, after the part of the data is discarded, the steps in this application are not affected, but only the display effect is partially reduced. The device performance may include, but is not limited to, network performance, device hardware performance, device data loading performance, or the like.

Figure 10:
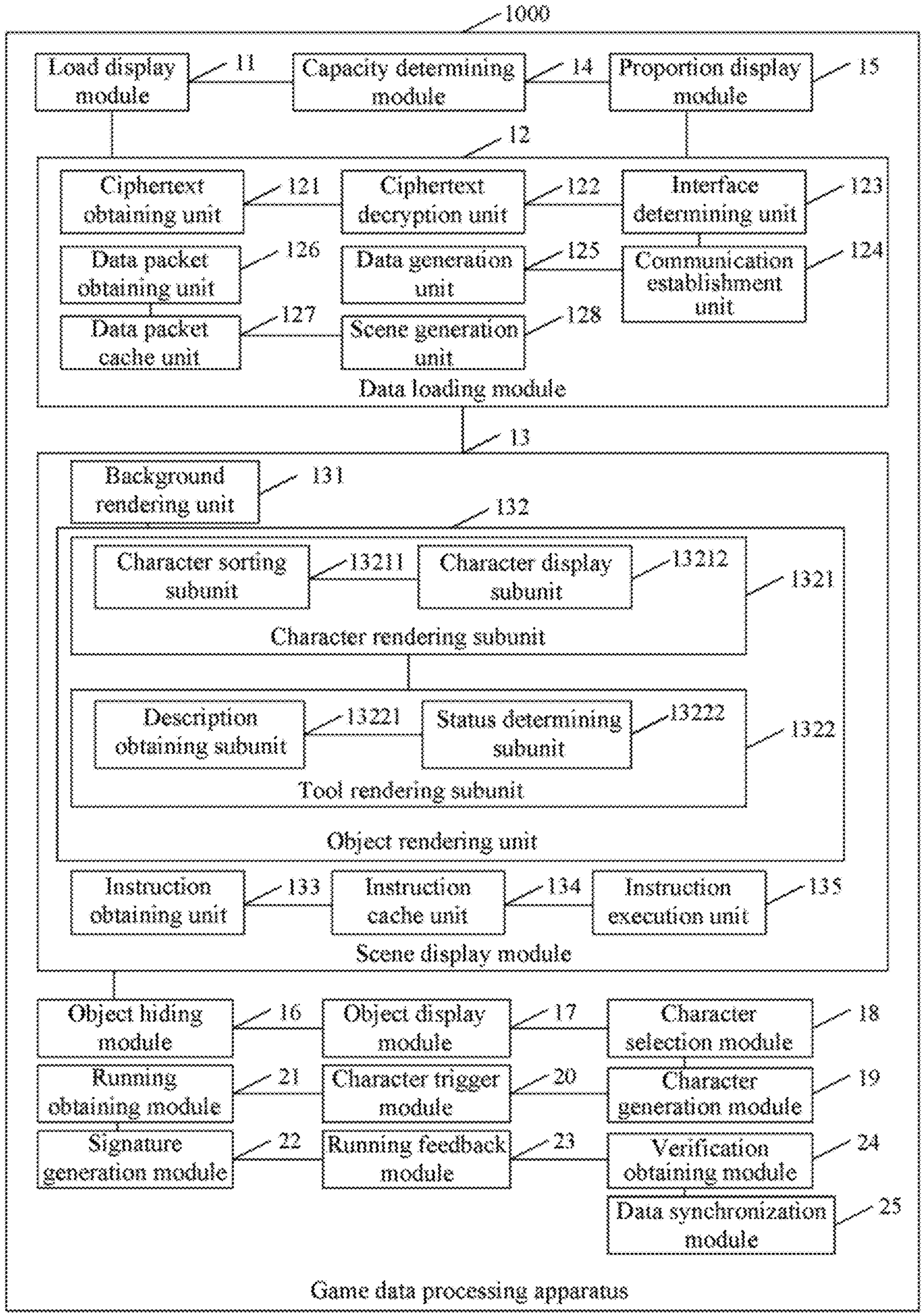
FIG. 10 is a schematic diagram of a game data processing apparatus according to an embodiment of this application.

Further, referring to FIG. 10, FIG. 10 is a schematic diagram of a game data processing apparatus according to an embodiment of this application. The game data processing apparatus may be a computer program (including program code) running in a computer device. For example, the game data processing apparatus is application software. The game data processing apparatus may be configured to perform corresponding steps in the method provided in the embodiments of this application. As shown in FIG. 10, the game data processing apparatus 1000 may be applied to the computer device in the embodiment corresponding to FIG.

3. Specifically, the game data processing apparatus may include a load display module 11, a data loading module 12, and a scene display module 13.

The load display module 11 is configured to display a game loading screen in a web presentation page in response to a game data loading request for a web simulation game.

The data loading module 12 is configured to obtain user game data in a client game associated with the web simulation game based on the game data loading request, and call a game engine of the web simulation game to obtain, through the game engine of the web simulation game, game scene data of the web simulation game that is generated based on the user game data.

The scene display module 13 is configured to switch the game loading screen displayed in the web presentation page to a game scene screen rendered based on the game scene data of the web simulation game, the game scene screen being used for responding to a game interactive operation associated with the web simulation game.

The data loading module 12 is specifically configured to play a game video of the web simulation game in the web presentation page based on the game data loading request; and trigger a call event of a game start interface in response to arrival of the playing at a preset game trigger location of the game video, call the game engine of the web simulation game through the game start interface, and obtain the game scene data of the web simulation game through the game engine of the web simulation game.

The apparatus 1000 further includes:

a capacity determining module 14, configured to determine a scene memory capacity for representing a memory size required to be occupied by the game scene data and a load memory capacity for representing a memory size occupied by data that has been loaded into the memory based on the game engine in the game scene data; and a proportion display module 15, configured to determine a loading proportion of the game scene data according to the scene memory capacity and the load memory capacity, and display the loading proportion in the game loading screen.

The game scene data includes game background data and game object data.

The scene display module 13 includes:

a background rendering unit 131, configured to switch, in the web presentation page, the game loading screen to a game background screen obtained through rendering based on the game background data; and an object rendering unit 132, configured to determine an object presentation area in the game background screen, render a game presentation object in the object presentation area according to the game object data, and determine the game background screen including the game presentation object as the game scene screen.

The apparatus 1000 further includes:

an object hiding module 16, configured to hide the object presentation area in response to a hide operation for the object presentation area, and display an object presentation area label in the game scene screen; and an object display module 17, configured to display the object presentation area in the game scene screen in response to a trigger operation for the object presentation area label.

The game object data includes character data and auxiliary tool data, and the game presentation object includes a game virtual character and a game auxiliary tool.

With respect to rendering the game presentation object in the object presentation area according to the game object data, the object rendering unit 132 includes:

a character rendering subunit 1321, configured to determine a character presentation area in the object presentation area, and render the game virtual character in the character presentation area according to the character data; and a tool rendering subunit 1322, configured to determine a tool presentation area in the object presentation area, and render the game auxiliary tool in the tool presentation area according to the auxiliary tool data.

With respect to rendering the game virtual character in the character presentation area according to the character data, the character rendering subunit 1321 includes:

a character sorting subunit 13211, configured to obtain character image information and character recommendation degrees from the character data, and sort the character image information based on the character recommendation degrees; and a character display subunit 13212, configured to sequentially render game virtual characters corresponding to the character image information in the character presentation area based on the sorted character image information.

With respect to rendering the game auxiliary tool in the tool presentation area according to the auxiliary tool data, the tool rendering subunit 1322 includes:

a description obtaining subunit 13221, configured to determine a tool data amount of the game auxiliary tool based on the auxiliary tool data, and obtain tool description information of the game auxiliary tool; and a status determining subunit 13222, configured to: when the tool data amount is zero, in the tool presentation area, render the game auxiliary tool with a first display state according to the auxiliary tool data and display the tool description information of the game auxiliary tool; the first display state being used for representing failure of the game auxiliary tool.

The status determining subunit 13222 is further configured to: when the tool data amount is at least one, in the tool presentation area, render the game auxiliary tool with a second display state according to the auxiliary tool data and display the tool description information of the game auxiliary tool; the second display state being used for representing validity of the game auxiliary tool.

With respect to obtaining the user game data in the client game, the data loading module 12 includes:

a ciphertext obtaining unit 121, configured to obtain login user information of the web simulation game, and obtain user game ciphertext corresponding to the login user information from the client game; the user game ciphertext being obtained by a first server corresponding to the client game by encrypting the user game data by using a local public key corresponding to the login user information; and a ciphertext decryption unit 122, configured to decrypt the user game ciphertext by using a local private key to obtain the user game data.

The scene display module 13 further includes:

an instruction obtaining unit 133, configured to obtain rendering data corresponding to pixels from the game scene data of the web simulation game based on the game engine of the web simulation game, and obtain rendering instructions corresponding to the render data;

an instruction cache unit 134, configured to sort the rendering instructions based on rendering locations of the pixels in the web presentation page, and sequentially add the sorted rendering instructions to a rendering queue; and an instruction execution unit 135, configured to obtain rendering types of the rendering instructions, execute the rendering instructions in the rendering queue based on the rendering types, and switch, based on the rendering instructions, the game loading screen to the game scene screen for display.

The data loading module 12 further includes:

an interface determining unit 123, configured to obtain the user game data in the client game associated with the web simulation game based on the game data loading request, and obtain a data loading interface associated with the game data loading request in the game engine of the web simulation game;

a communication establishment unit 124, configured to establish data communication based on the data loading interface and the game engine of the web simulation game, call the game engine of the web simulation game based on the data communication, and transmit the user game data to the game engine of the web simulation game; and a data generation unit 125, configured to generate the game scene data of the web simulation game according to the user game data based on the game engine of the web simulation game.

The apparatus 1000 further includes:

a character selection module 18, configured to display, in the game scene screen in response to a game configuration operation for the game scene screen, a target game virtual character corresponding to the game configuration operation;

a character generation module 19, configured to generate a to-be-triggered game virtual character based on the game engine of the web simulation game, and display the to-be-triggered game virtual character in the game scene screen; the to-be-triggered game virtual character and the target game virtual character belonging to different camp sets; and a character trigger module 20, configured to trigger the to-be-triggered game virtual character based on the target game virtual character in response to a trigger operation for the to-be-triggered game virtual character, determine a game score according to the triggered to-be-triggered game virtual character, obtain a character identifier of the triggered to-be-triggered game virtual character, and add the character identifier to a set of triggered characters; the set of triggered characters being used for detecting the game score.

The apparatus 1000 further includes:

a running obtaining module 21, configured to obtain running data of the web simulation game when the web simulation game stops running; the running data including a game identifier, the game score, the number of triggered characters, a game end timestamp, and the set of triggered characters;

a signature generation module 22, configured to generate a game matching signature according to the game identifier, the game score, and the game end timestamp; and a running feedback module 23, configured to transmit the game identifier, the game score, the number of triggered characters, the game end timestamp, the set of triggered characters, and the game matching signature to a second server, so that the second server verifies validity of the running data, and determines the running data as invalid data when the verification of the running data fails; the game identifier, the game score, and the game end timestamp being used for verifying validity of the game matching signature, and the set of triggered characters and the number of triggered characters being used for verifying validity of the game score; and the second server being a server corresponding to the web simulation game.

The apparatus 1000 further includes:

a verification obtaining module 24, configured to obtain a verification result of the second server for the running data; and a data synchronization module 25, configured to determine the running data as valid data when the verification result is a verification success result, obtain login user information of the web simulation game, and transmit the running data and the login user information to a first server corresponding to the client game, so that the first server transmits game virtual assets to a user account corresponding to the login user information based on the running data; the user account being an account associated with the login user information in the client game.

Initial simulation data includes at least two data packets.

With respect to calling the game engine to obtain, from the game engine, the game scene data that is generated based on the user game data, the data loading module 12 includes:

a data packet obtaining subunit 126, configured to call the game engine of the web simulation game to obtain an $i^{th}$ data packet transmitted by a second server corresponding to the web simulation game; i being a positive integer, and i being less than or equal to the number of the at least two data packets;

a data packet cache subunit 127, configured to obtain a transmission timestamp carried in the $i^{th}$ data packet, and add the $i^{th}$ data packet to to-be-rendered game data based on the transmission timestamp; the to-be-rendered game data including a data packet that has been obtained in the initial simulation data, and the transmission timestamp being used for representing a time at which the $i^{th}$ data packet is initially transmitted by the second server during transmission of the initial simulation data; and a scene generation unit 128, configured to generate the game scene data of the web simulation game according to the user game data and the initial simulation data.

An embodiment of this application provides a game data processing apparatus. The apparatus displays a game loading screen in a web presentation page in response to a game data loading request for a web simulation game; obtains user game data in a client game associated with the web simulation game based on the game data loading request, and calls a game engine of the web simulation game to obtain, through the game engine of the web simulation game, game scene data of the web simulation game that is generated based on the user game data, the client game being a published game corresponding to the web simulation game; and switches the game loading screen displayed in the web presentation page to a game scene screen rendered based on the game scene data; the game scene screen being used for responding to a game interactive operation associated with the web simulation game. Through integration of a web page and a game engine, promotion of a game is implemented, a related description of the game can be displayed, and interaction with a user can be implemented. In addition, data of the user in a real game (the client game) is obtained and the data is combined with the promotion of the game, so that a page presented by the promotion of the game is more realistic, thereby improving user experience and improving richness of game promotion content. Moreover, the web simulation game is a game used for promotion and generated based on the client game, and occupies a small memory space, thereby saving resources. In addition, fluency of game promotion presentation screens is improved by pre-loading data before rendering.

Figure 11:
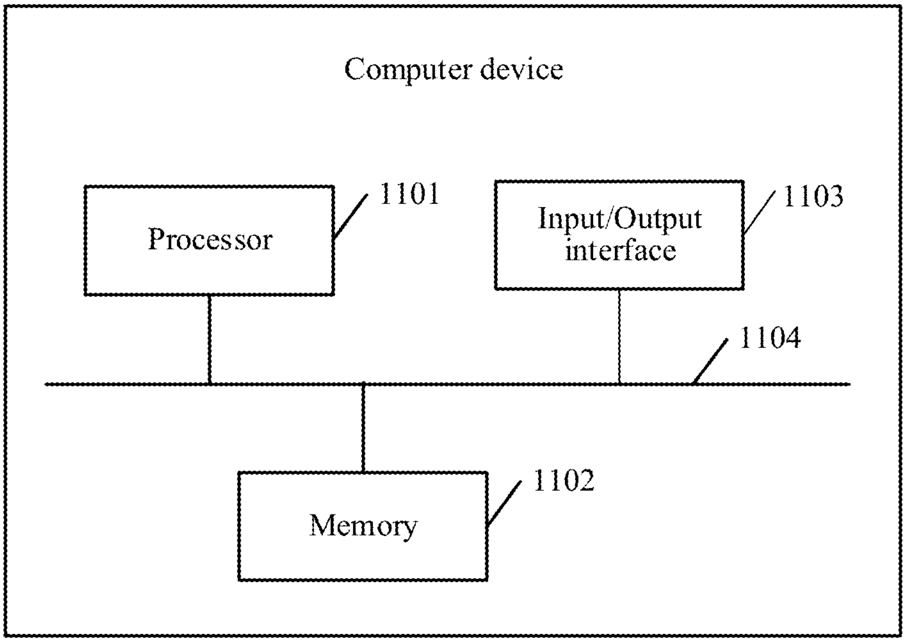
FIG. 11 is a schematic structural diagram of a computer device according to an embodiment of this application.

Referring to FIG. 11, FIG. 11 is a schematic structural diagram of a computer device according to an embodiment of this application. As shown in FIG. 11, the computer device in this embodiment may include one or more processors 1101, a memory 1102, and an input/output interface 1103. The processor 1101, the memory 1102, and the input/output interface 1103 are connected through a bus 1104. The memory 1102 is configured to store a computer program, the computer program including a program instruction. The input/output interface 1103 is configured to receive data and output data. The processor 1101 is configured to execute the program instruction stored in the memory 1102 to perform the following operations:

displaying a game loading screen in a web presentation page in response to a game data loading request for a web simulation game;

obtaining user game data in a client game associated with the web simulation game based on the game data loading request, and calling a game engine of the web simulation game to obtain, through the web simulation game, game scene data of the web simulation game that is generated based on the user game data; the client game being a published game corresponding to the web simulation game; and switching the game loading screen displayed in the web presentation page to a game scene screen rendered based on the game scene data; the game scene screen being used for responding to a game interactive operation associated with the web simulation game.

In some embodiments, the foregoing processor 1101 may be a central processing unit (CPU). The processor may further be another general-purpose processor, a digital signal processor (DSP), an application-specific integrated circuit (ASIC), a field-programmable gate array (FPGA), or another programmable logic device, a discrete gate or a transistor logic device, a discrete hardware component, or the like. The general-purpose processor may be a microprocessor, or the processor may be any conventional processor and the like.

The memory 1102 may include a read-only memory and a random access memory, and provide an instruction and data to the processor 1101 and the input/output interface 1103. A part of the memory 1102 may further include a non-volatile random access memory. For example, the memory 1102 may further store information of a device type.

In a specific implementation, the foregoing computer device may perform the implementations provided in the operations of steps in FIG. 3 through built-in functional modules of the computer. For details, reference may be made to the implementations provided in the foregoing operations steps in FIG. 3 and details are not described herein again.

An embodiment of this application provides a computer device, including: a processor, an input/output interface, and a memory. The processor A acquires a computer instruction in the memory is obtained through the processor, to perform each the steps of the methods shown in FIG. 3 and perform game data processing operations. This embodiment implements: displaying a game loading screen in a web presentation page in response to a game data loading request for a web simulation game; obtaining user game data in a client game associated with the web simulation game based on the game data loading request, and calling a game engine of the web simulation game to obtain, through the game engine, game scene data of the web simulation game that is generated based on the user game data, the client game being a published game corresponding to the web simulation game; and switching the game loading screen displayed in the web presentation page to a game scene screen rendered based on the game scene data; the game scene screen being used for responding to a game interactive operation associated with the web simulation game. Through integration of a web page and a game engine, promotion of a game is implemented, a related description of the game can be displayed, and interaction with a user can be implemented. In addition, data of the user in a real game (the client game) is obtained and the data is combined with the promotion of the game, so that a page presented by the promotion of the game is more realistic, thereby improving user experience and improving richness of game promotion content. Moreover, the web simulation game is a game used for promotion and generated based on the client game, and occupies a small memory space, thereby saving resources. In addition, fluency of game promotion presentation screens is improved by pre-loading data before rendering.

In this embodiment, a computer-readable storage medium is further provided, storing a computer program, the computer program including program instructions, the program instructions, when executed by the processor, implementing the game data processing method provided by various steps in FIG. 3. For details, reference may be made to the implementations provided by the various steps in FIG. 3. Details are not described herein again. In addition, the description of beneficial effects of using the same method are not described herein again. For technical details that are not disclosed in the embodiments of the computer-readable storage medium of this application, refer to the method embodiments of this application. In an example, the program instructions may be deployed to be executed on a computer device, or deployed to be executed on a plurality of computer devices at the same location, or deployed to be executed on a plurality of computer devices that are distributed in a plurality of locations and interconnected by a communication network.

The computer-readable storage medium may be the game data processing apparatus provided in any of the foregoing embodiments or an internal storage unit of the computer device, for example, a hard disk or an internal memory of the computer device. The computer-readable storage medium may also be an external storage device of the computer device, such as a plug-in hard disk, a smart media card (SMC), a secure digital (SD) card, or a flash card that is equipped on the computer device. Further, the computer-readable storage medium may also include an internal storage unit of the computer device and an external storage device. The computer-readable storage medium is configured to store the computer program and another program and data that are required by the computer device. The computer-readable storage medium may be further configured to temporarily store data that has been outputted or data to be outputted.

The embodiments of this application further provide a computer program product or a computer program. The computer program product or the computer program includes computer instructions, the computer instructions being stored in a computer-readable storage medium. A processor of a computer device reads the computer instructions from the computer-readable storage medium and executes the computer instructions to cause the computer device to perform the method provided in the various implementations in FIG. 3.

In this embodiment, claims, and accompanying drawings of this application, the terms "first" and "second" are intended to distinguish between different objects but do not indicate a particular order. In addition, the term "include", and any variant thereof are intended to cover a non-exclusive inclusion. For example, a process, method, apparatus, product, or device that includes a series of steps or modules is not limited to the listed steps or modules; and instead, further, in some embodiments, includes a step or module that is not listed, or further, in some embodiment, includes another step or unit that is intrinsic to the process, method, apparatus, product, or device.

A person of ordinary skill in the art may be aware that the units and algorithm steps in the examples described with reference to the embodiments disclosed herein may be implemented by electronic hardware, computer software, or a combination thereof. To clearly describe the interchangeability between the hardware and the software, the foregoing has generally described compositions and steps of each example according to functions. Whether the functions are executed in a mode of hardware or software depends on particular applications and design constraint conditions of the technical solutions. A person skilled in the art may use different methods to implement the described functions for each particular application, but it should not be considered that the implementation goes beyond the scope of this application.

The methods and related apparatuses provided by the embodiments of this application are described with reference to the method flowcharts and/or schematic structural diagrams provided in the embodiments of this application. Specifically, each process of the method flowcharts and/or each block of the schematic structural diagrams, and a combination of processes in the flowcharts and/or blocks in the block diagrams can be implemented by computer program instructions. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the schematic structural diagrams. These computer program instructions may also be stored in a computer-readable memory that can guide a computer or another programmable data processing device to work in a specified manner, so that the instructions stored in the computer-readable memory generate a product including an instruction apparatus, where the instruction apparatus implements functions specified in one or more processes in the flowcharts and/or one or more blocks in the schematic structural diagrams. The computer program instructions may also be loaded onto a computer or another programmable data processing device, so that a series of operations and steps are performed on the computer or another programmable device, thereby generating computer-implemented processing. Therefore, the instructions executed on the computer or another programmable device provide steps for implementing a specific function in one or more processes in the flowcharts and/or in one or more blocks in the schematic structural diagrams.

What are disclosed above are merely examples of embodiments of this application, and certainly are not intended to limit the protection scope of this application. Therefore, equivalent variations made in accordance with the claims of this application shall fall within the scope of this application.

What is claimed is:

1. A game data processing method, the method comprising:

displaying a game loading screen in a web presentation page in response to a game data loading request for a web simulation game;

obtaining user game data in a client game associated with the web simulation game based on the game data loading request, and obtaining a data loading interface associated with the game data loading request in a game engine of the web simulation game;

establishing data communication based on the data loading interface and the game engine of the web simulation game, calling the game engine of the web simulation game based on the data communication, and transmitting the user game data to the game engine of the web simulation game;

generating game scene data of the web simulation game according to the user game data based on the game engine of the web simulation game; and displaying a game scene screen rendered based on the game scene data of the web simulation game, the game scene screen responsive to a game interactive operation associated with the web simulation game.

2. The method according to claim 1, further comprising:

playing a game video of the web simulation game in the web presentation page based on the game data loading request; and triggering a call event of a game start interface in response to playing at a preset game trigger location of the game video, calling the game engine of the web simulation game through the game start interface, and obtaining the game scene data of the web simulation game through the game engine of the web simulation game.

3. The method according to claim 1, wherein the game scene data of the web simulation game comprises game background data and game object data; and the displaying the game scene screen rendered based on the game scene data of the web simulation game comprises:

switching, in the web presentation page, the game loading screen to a game background screen obtained through rendering based on the game background data; and determining an object presentation area in the game background screen, rendering a game presentation object in the object presentation area according to the game object data, and determining the game background screen comprising the game presentation object as the game scene screen.

4. The method according to claim 3, wherein the game object data comprises character data and auxiliary tool data, and the game presentation object comprises a game virtual character and a game auxiliary tool; and the rendering a game presentation object in the object presentation area according to the game object data comprises:

determining a character presentation area in the object presentation area, and rendering the game virtual character in the character presentation area according to the character data; and determining a tool presentation area in the object presentation area, and rendering the game auxiliary tool in the tool presentation area according to the auxiliary tool data.

5. The method according to claim 4, wherein the rendering the game virtual character in the character presentation area according to the character data comprises:

obtaining character image information and character recommendation degrees from the character data, and sorting the character image information based on the character recommendation degrees; and sequentially rendering game virtual characters corresponding to the character image information in the character presentation area based on the sorted character image information.

6. The method according to claim 4, wherein the rendering the game auxiliary tool in the tool presentation area according to the auxiliary tool data comprises:

determining a tool data amount of the game auxiliary tool based on the auxiliary tool data, and obtaining tool description information of the game auxiliary tool;

when the tool data amount is zero, in the tool presentation area, rendering the game auxiliary tool with a first display state according to the auxiliary tool data and displaying the tool description information of the game auxiliary tool; the first display state indicating failure of the game auxiliary tool; and when the tool data amount is at least one, in the tool presentation area, rendering the game auxiliary tool with a second display state according to the auxiliary tool data and displaying the tool description information of the game auxiliary tool; the second display state indicating validity of the game auxiliary tool.

7. The method according to claim 1, wherein the obtaining user game data in a client game comprises:

obtaining login user information of the web simulation game, and obtaining user game ciphertext corresponding to the login user information from the client game; the user game ciphertext being obtained by a first server corresponding to the client game by encrypting the user game data by using a local public key corresponding to the login user information; and decrypting the user game ciphertext by using a local private key to obtain the user game data.

8. The method according to claim 1, wherein displaying a game scene screen rendered based on the game scene data of the web simulation game comprises:

obtaining rendering data corresponding to pixels from the game scene data of the web simulation game based on the game engine of the web simulation game, and obtaining rendering instructions corresponding to the render data;

sorting the rendering instructions based on rendering locations of the pixels in the web presentation page, and sequentially adding the sorted rendering instructions to a rendering queue; and obtaining rendering types of the rendering instructions, executing the rendering instructions in the rendering queue based on the rendering types, and switching, based on the rendering instructions, the game loading screen to the game scene screen for display.

9. The method according to claim 1, wherein the method further comprises:

displaying, in the game scene screen in response to a game configuration operation for the game scene screen, a target game virtual character corresponding to the game configuration operation;

generating a game virtual character based on the game engine of the web simulation game, and displaying the game virtual character in the game scene screen; the game virtual character and the target game virtual character belonging to different camp sets; and triggering the game virtual character based on the target game virtual character in response to a trigger operation for the game virtual character, determining a game score according to the triggered game virtual character, obtaining a character identifier of the triggered game virtual character, and adding the character identifier to a set of triggered characters; the set of triggered characters being used to detect the game score.

10. The method according to claim 9, wherein the method further comprises:

obtaining running data of the web simulation game when the web simulation game stops running; the running data comprising a game identifier, the game score, the number of triggered characters, a game end timestamp, and the set of triggered characters;

generating a game matching signature according to the game identifier, the game score, and the game end timestamp; and transmitting the game identifier, the game score, the number of triggered characters, the game end timestamp, the set of triggered characters, and the game matching signature to a second server, so that the second server verifies validity of the running data, and determines the running data as invalid data when the verification of the running data fails, the game identifier, the game score, and the game end timestamp being used for verifying validity of the game matching signature, and the set of triggered characters and the number of triggered characters being used for verifying validity of the game score, and the second server being a server corresponding to the web simulation game.

11. The method according to claim 10, wherein the method further comprises:

obtaining a verification result of the second server for the running data; and determining the running data as valid data when the verification result is a verification success result, obtaining login user information of the web simulation game, and transmitting the running data and the login user information to a first server corresponding to the client game, so that the first server transmits game virtual assets to a user account corresponding to the login user information based on the running data; the user account being an account associated with the login user information in the client game.

12. The method according to claim 1, wherein initial simulation data comprises at least two data packets; and the calling a game engine of the web simulation game to obtain, through the game engine of the web simulation game, game scene data of the web simulation game that is generated based on the user game data comprises:

calling the game engine of the web simulation game to obtain an ith data packet transmitted by a second server corresponding to the web simulation game, i being a positive integer and less than or equal to the number of the at least two data packets;

obtaining a transmission timestamp carried in the ith data packet, and adding the ith data packet to to-be-rendered game data based on the transmission timestamp, the to-be-rendered game data comprising a data packet that has been obtained in the initial simulation data, and the transmission timestamp representing a time at which the ith data packet is initially transmitted by the second server during transmission of the initial simulation data; and generating the game scene data of the web simulation game according to the user game data and the initial simulation data.

13. A non-transitory computer-readable storage medium, storing a computer program, the computer program comprising a program instruction, and the program instruction, when executed by a processor, causing the processor to perform:

displaying a game loading screen in a web presentation page in response to a game data loading request for a web simulation game;

obtaining user game data in a client game associated with the web simulation game based on the game data loading request, and obtaining a data loading interface associated with the game data loading request in a game engine of the web simulation game;

establishing data communication based on the data loading interface and the game engine of the web simulation game, calling the game engine of the web simulation game based on the data communication, and transmitting the user game data to the game engine of the web simulation game;

generating game scene data of the web simulation game according to the user game data based on the game engine of the web simulation game; and displaying a game scene screen rendered based on the game scene data of the web simulation game, the game scene screen responsive to a game interactive operation associated with the web simulation game.

14. The computer-readable storage medium according to claim 13, wherein the program instruction further causes the processor to perform:

playing a game video of the web simulation game in the web presentation page based on the game data loading request; and triggering a call event of a game start interface in response to playing at a preset game trigger location of the game video, calling the game engine of the web simulation game through the game start interface, and obtaining the game scene data of the web simulation game through the game engine of the web simulation game.

15. The computer-readable storage medium according to claim 13, wherein the game scene data of the web simulation game comprises game background data and game object data; and the displaying the game scene screen rendered based on the game scene data of the web simulation game comprises:

switching, in the web presentation page, the game loading screen to a game background screen obtained through rendering based on the game background data; and determining an object presentation area in the game background screen, rendering a game presentation object in the object presentation area according to the game object data, and determining the game background screen comprising the game presentation object as the game scene screen.

16. The computer-readable storage medium according to claim 15, wherein the game object data comprises character data and auxiliary tool data, and the game presentation object comprises a game virtual character and a game auxiliary tool; and the rendering a game presentation object in the object presentation area according to the game object data comprises:

determining a character presentation area in the object presentation area, and rendering the game virtual character in the character presentation area according to the character data; and determining a tool presentation area in the object presentation area, and rendering the game auxiliary tool in the tool presentation area according to the auxiliary tool data.

17. The computer-readable storage medium according to claim 16, wherein the rendering the game virtual character in the character presentation area according to the character data comprises:

obtaining character image information and character recommendation degrees from the character data, and sorting the character image information based on the character recommendation degrees; and sequentially rendering game virtual characters corresponding to the character image information in the character presentation area based on the sorted character image information.

18. The computer-readable storage medium according to claim 16, wherein the rendering the game auxiliary tool in the tool presentation area according to the auxiliary tool data comprises:

determining a tool data amount of the game auxiliary tool based on the auxiliary tool data, and obtaining tool description information of the game auxiliary tool;

when the tool data amount is zero, in the tool presentation area, rendering the game auxiliary tool with a first display state according to the auxiliary tool data and displaying the tool description information of the game auxiliary tool; the first display state indicating failure of the game auxiliary tool; and when the tool data amount is at least one, in the tool presentation area, rendering the game auxiliary tool with a second display state according to the auxiliary tool data and displaying the tool description information of the game auxiliary tool; the second display state indicating validity of the game auxiliary tool.

19. An electronic device, comprising: a memory, and a processor coupled to the memory, the processor being configured to perform:

displaying a game loading screen in a web presentation page in response to a game data loading request for a web simulation game;

obtaining user game data in a client game associated with the web simulation game based on the game data loading request, and obtaining a data loading interface associated with the game data loading request in a game engine of the web simulation game;

establishing data communication based on the data loading interface and the game engine of the web simulation game, calling the game engine of the web simulation game based on the data communication, and transmitting the user game data to the game engine of the web simulation game;

generating game scene data of the web simulation game according to the user game data based on the game engine of the web simulation game; and displaying a game scene screen rendered based on the game scene data of the web simulation game, the game scene screen responsive to a game interactive operation associated with the web simulation game.

* * * * *